(12) United States Patent
Tsuji et al.

(10) Patent No.: US 12,097,858 B2
(45) Date of Patent: Sep. 24, 2024

(54) TRAVEL CONTROL METHOD AND TRAVEL CONTROL DEVICE FOR VEHICLE

(71) Applicant: Nissan Motor Co., Ltd., Yokohama (JP)

(72) Inventors: Masafumi Tsuji, Kanagawa (JP); Akinobu Goto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/282,140

(22) PCT Filed: Mar. 17, 2021

(86) PCT No.: PCT/JP2021/010900
§ 371 (c)(1),
(2) Date: Sep. 14, 2023

(87) PCT Pub. No.: WO2022/195775
PCT Pub. Date: Sep. 22, 2022

(65) Prior Publication Data
US 2024/0262363 A1    Aug. 8, 2024

(51) Int. Cl.
*B60W 30/18*    (2012.01)
*B60W 40/06*    (2012.01)

(52) U.S. Cl.
CPC ...... *B60W 30/18159* (2020.02); *B60W 40/06* (2013.01); *B60W 2552/10* (2020.02); *B60W 2720/10* (2013.01)

(58) Field of Classification Search
None
See application file for complete search history.

(56) References Cited

U.S. PATENT DOCUMENTS

2015/0134204 A1  5/2015  Kunihiro et al.
2020/0051436 A1  2/2020  Ochida et al.

FOREIGN PATENT DOCUMENTS

JP  2008-114778 A   5/2008
WO  2014/006759 A1  1/2014
WO  2018/179252 A1  10/2018

*Primary Examiner* — David P. Merlino
(74) *Attorney, Agent, or Firm* — Young Basile Hanlon & MacFarlane, P.C.

(57) ABSTRACT

A travel control method is provided, in which a subject vehicle is controlled to autonomously travel on a road including intersections, the travel control method comprising: determining whether or not an intersection for the subject vehicle to seek to pass straight through is an offset intersection that is offset to the right or left with respect to a direction straight ahead of the subject vehicle; and when the intersection is an offset intersection, controlling the subject vehicle to pass through the intersection at a lower speed than when the intersection is not an offset intersection.

10 Claims, 17 Drawing Sheets

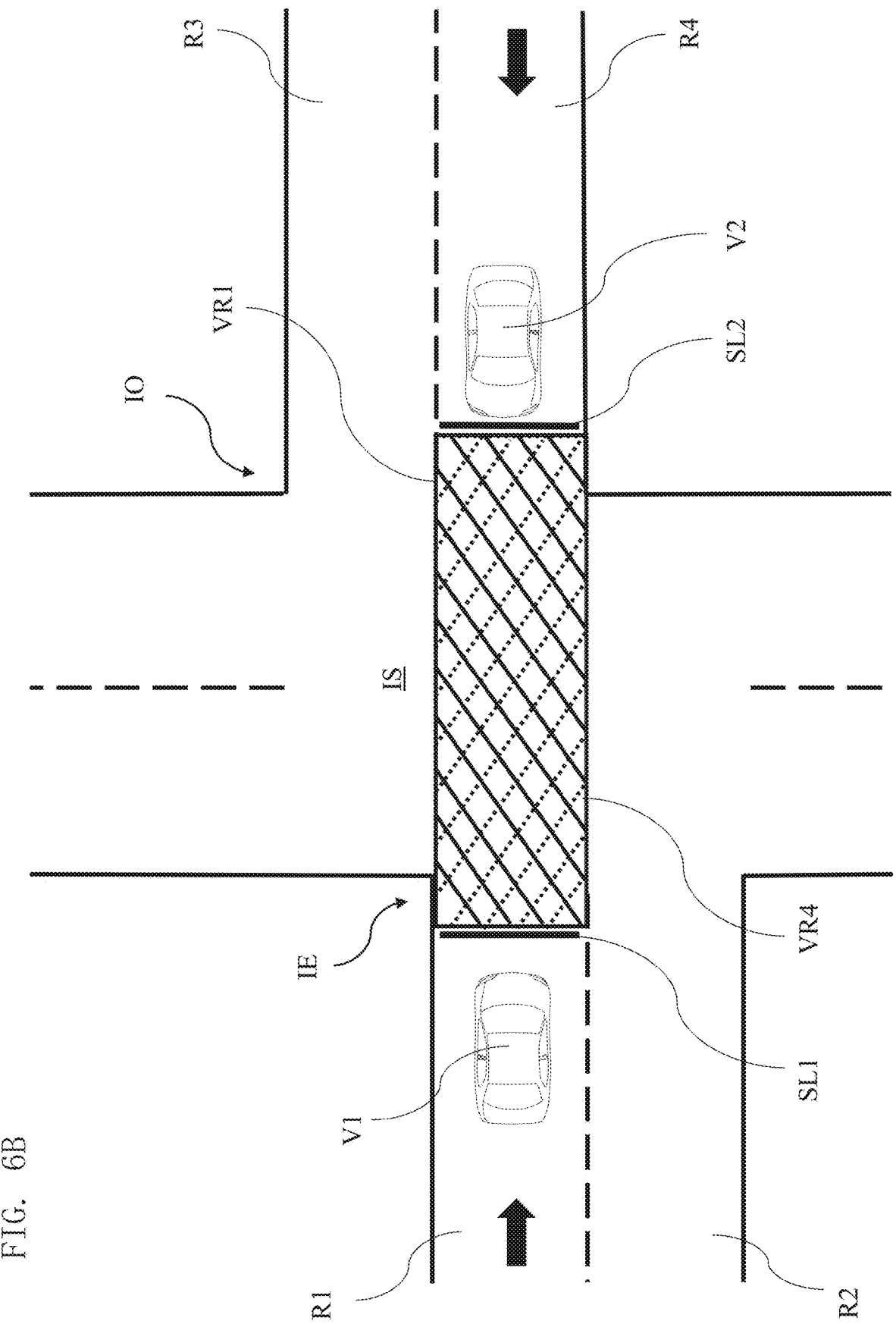

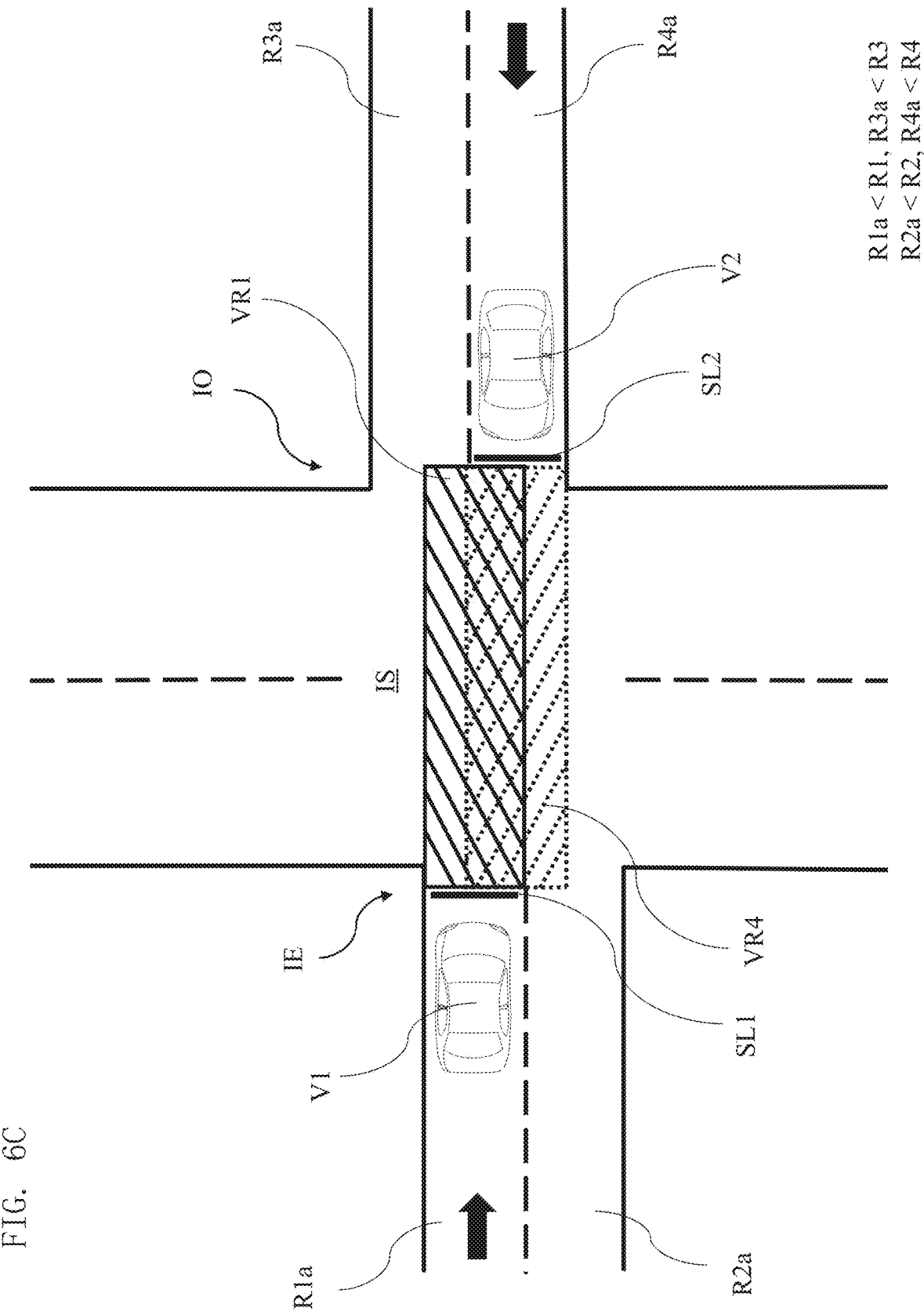

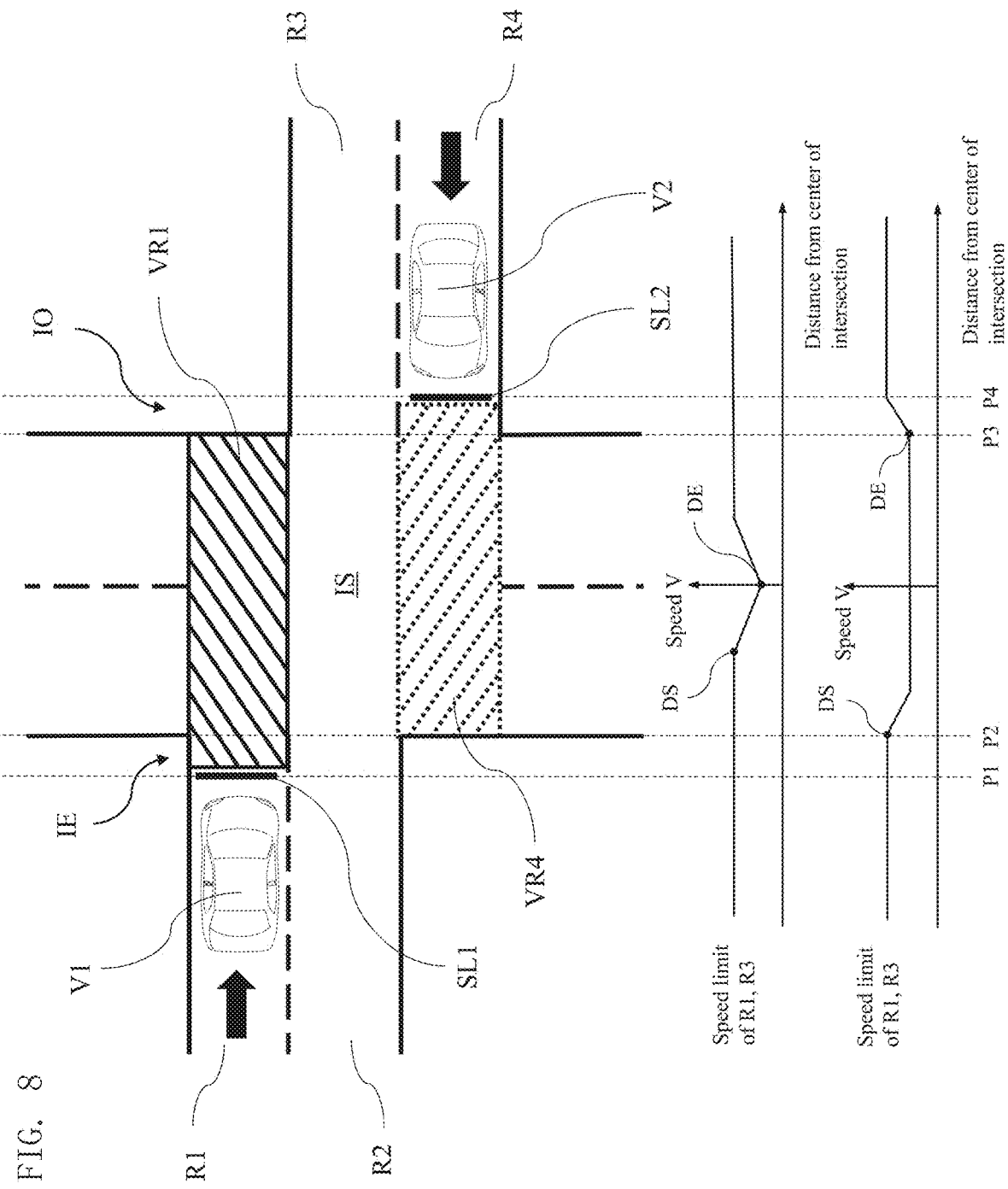

TRAVEL CONTROL METHOD AND TRAVEL CONTROL DEVICE FOR VEHICLE

TECHNICAL FIELD

The present invention relates to a travel control method and a travel control device for a vehicle.

BACKGROUND

A traveling assist system is known, which is used when a subject vehicle passes straight through an offset intersection in which lanes connected to the entrance and exit of the intersection are shifted in the right or left direction (see FIGS. 9A and 9B of WO2018/179252). This system is configured to: set two virtual compartment lines in the intersection to extrapolate the subject vehicle lane between at the entrance and exit of the intersection; and control the subject vehicle to keep lane along the virtual compartment lines thereby executing the travel control in the offset intersection.

SUMMARY

Unfortunately, however, when the subject vehicle autonomously travels through an offset intersection using the above conventional traveling assist system, the subject vehicle and the oncoming vehicle face each other in the intersection or the subject vehicle faces the oncoming lane near the exit of the intersection, and there is thus a problem in that the occupants may feel uneasy.

A problem to be solved by the present invention is to provide a travel control method and a travel control device for a vehicle that are able to eliminate or alleviate the uneasy feeling given to the occupants when autonomously traveling through an offset intersection.

The present invention solves the above problem through determining whether or not an intersection for the subject vehicle to seek to pass straight through is an offset intersection and, when the intersection is an offset intersection, controlling the subject vehicle to pass through the intersection at a lower speed than when the intersection is not an offset intersection.

According to the present invention, it is possible to eliminate or alleviate the uneasy feeling given to the occupants when autonomously traveling through an offset intersection.

BRIEF DESCRIPTION OF THE DRAWINGS

FIG. 6B is a plan view (part 2) illustrating still another example of a scene of traveling through an offset intersection using the travel control device for a vehicle of the present invention;

FIG. 6C is a plan view (part 3) illustrating still another example of a scene of traveling through an offset intersection using the travel control device for a vehicle of the present invention;

FIG. 8 is a set of the plan view (upper diagram) illustrating the travel scene of FIG. 4B and graphs (middle and lower diagrams) each illustrating an example of the speed of the subject vehicle and the position in the intersection;

DETAILED DESCRIPTION

«Configuration of Travel Control Device»

Figure 1:
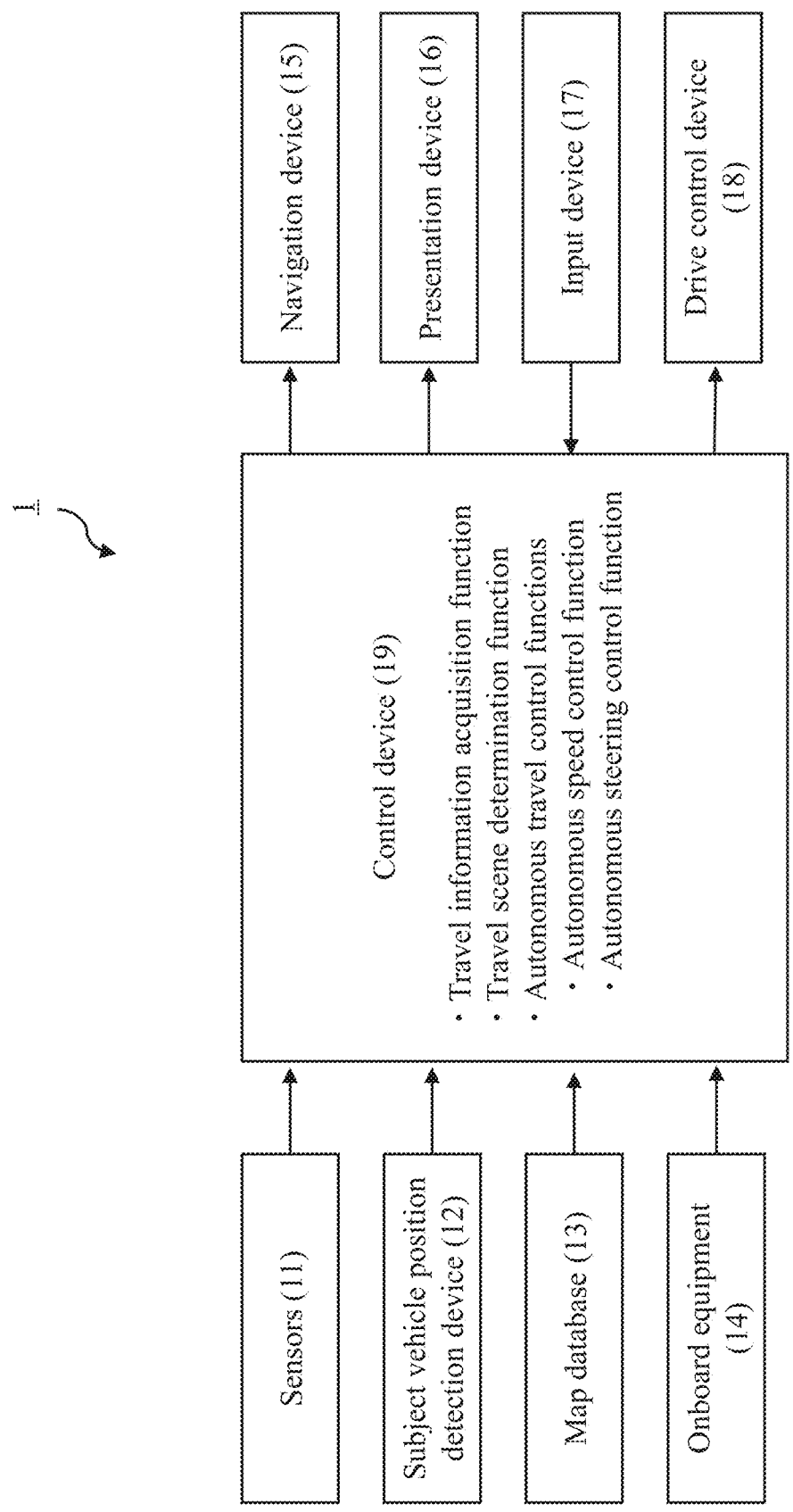
FIG. 1 is a block diagram illustrating an embodiment of the travel control device for a vehicle according to the present invention.

Hereinafter, one or more embodiments of the present invention will be described with reference to the drawings. FIG. 1 is a block diagram illustrating the configuration of a travel control device 1 for a vehicle according to an embodiment of the present invention. The travel control device 1 of the present embodiment represents an embodiment for carrying out the travel control method for a vehicle according to the present invention.

As illustrated in FIG. 1, the travel control device 1 of the present embodiment includes sensors 11, a subject vehicle position detection device 12, a map database 13, onboard equipment 14, a navigation device 15, a presentation device 16, an input device 17, a drive control device 18, and a control device 19. These devices are connected to one another, for example, via a controller area network (CAN) or other onboard LAN and can mutually exchange information.

The sensors 11 detect a traveling state of a subject vehicle. Examples of the sensors 11 include, for example, a front camera that captures images ahead of the subject vehicle, side cameras that capture images of the right and left sides of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, a touch sensor (capacitance sensor) that detects whether or not the driver holds the steering wheel, an onboard camera that captures images of the driver, etc. The sensors 11 may be represented by one of the above-described various sensors or may also be configured as a combination of two or more sensors. The detection results of the sensors 11 are output to the control device 19 at predetermined time intervals.

The subject vehicle position detection device 12 includes a GPS unit, a gyro-sensor, a vehicle speed sensor, etc. The subject vehicle position detection device 12 uses the GPS unit to detect radio waves transmitted from a plurality of communication satellites and periodically acquire the positional information of a target vehicle (subject vehicle). In addition, the subject vehicle position detection device 12 detects the current position of the target vehicle based on the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 19 at predetermined time intervals.

The map database 13 is a memory that stores three-dimensional high-precision map information including positional information of various facilities and specific points and is accessible from the control device 19. The three-dimensional high-precision map information is three-dimensional map information based on the road shape detected when traveling on an actual road using a vehicle for data acquisition. The three-dimensional high-precision map information is map information in which detailed and highly precise positional information items, such as a curved route and the size of the curve (e.g., curvature or radius of curvature), a merging point and a branching point of a road, a tollgate, and a position at which the number of lanes is reduced, are associated as the three-dimensional information with the map information. Note, however, that the map information stored in the map database of the present invention is not limited only to such three-dimensional high-precision map information and may be other map information.

The onboard equipment 14 includes various modules equipped in the vehicle and is operated by the driver's operation. Examples of such onboard equipment include a steering wheel, an accelerator pedal, a brake pedal, direction indicators, wipers, lights, a horn, and other specific switches. When operated by the driver, the onboard equipment 14 outputs its operation information to the control device 19.

The navigation device 15 acquires the current positional information of the subject vehicle from the subject vehicle position detection device 12 and displays the position of the subject vehicle on a display or the like with the map information for guidance on which the position of the subject vehicle is superimposed. In addition, the navigation device 15 has a navigation function of calculating a route to a destination when the driver inputs the destination and guiding the driver along the set route. With this navigation function, the navigation device 15 displays the route to the destination on the map of the display and notifies the driver of the recommended travel behavior on the route by voice or the like.

The presentation device 16 includes various displays such as a display included in the navigation device 15, a display incorporated in the rearview mirror, a display incorporated in the meter unit, and a head-up display projected on the windshield. The presentation device 16 also includes other devices than the displays, such as a speaker of an audio device and a seat device with embedded vibrating bodies. The presentation device 16 informs the driver of various presentation information items under the control by the control device 19.

Figure 2:
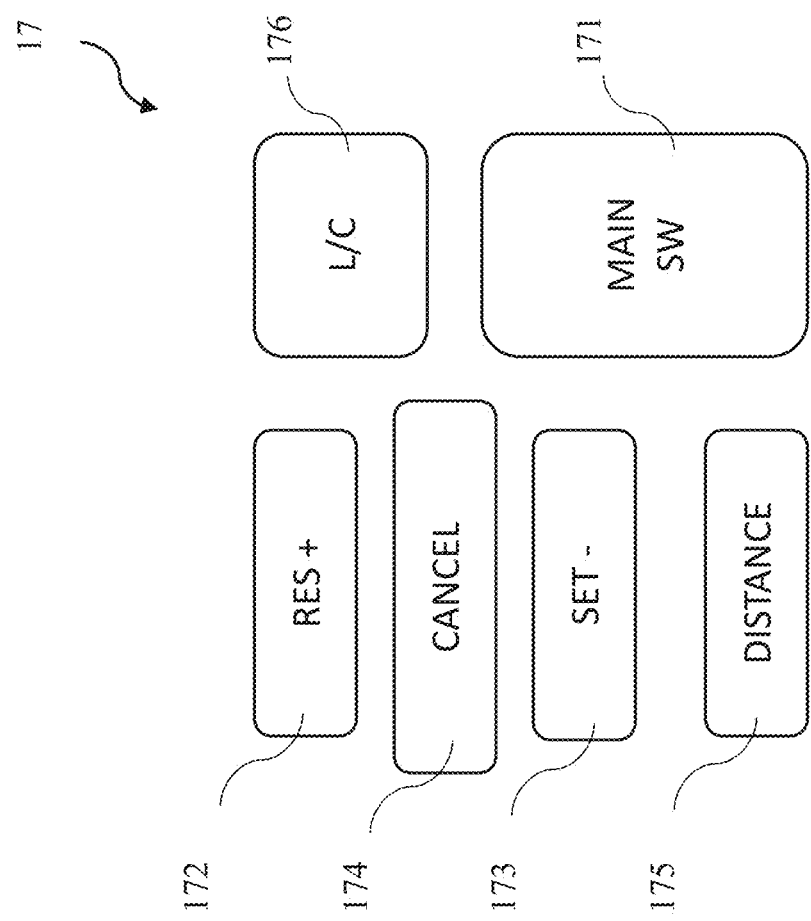
FIG. 2 is a front view illustrating a part of the input device of FIG. 1.

The input device 17 is, for example, a device such as a button switch or a touch panel disposed on a display screen with which the driver can input information by the manual operation or a microphone with which the driver can input information by the voice. In the present embodiment, the driver can operate the input device 17 thereby to input setting information in response to the presentation information which is presented by the presentation device 16. FIG. 2 is a front view illustrating a part of the input device 17 of the present embodiment and represents an example including a set of button switches arranged on a spoke part or the like of the steering wheel.

The illustrated input device 17 includes button switches used when setting ON/OFF of autonomous travel control functions (an autonomous speed control function and an autonomous steering control function) of the control device 19. Details of the autonomous travel control functions including the autonomous speed control function and autonomous steering control function will be described later. The input device 17 of the present embodiment includes a main switch (MAIN SW) 171, a resume/acceleration switch (RES +) 172, a set/coast switch (SET −) 173, a cancel switch (CANCEL) 174, an inter-vehicle distance adjustment switch (DISTANCE) 175, and a lane change assist switch (L/C) 176.

The main switch 171 is a switch for turning ON/OFF the power source of the system which achieves the autonomous speed control function and autonomous steering control function of the control device 19. The resume/acceleration switch 172 is a switch for performing a resume operation of once turning OFF the autonomous speed control function and then resuming the autonomous speed control function at the set speed before the OFF state, performing another resume function of following a preceding vehicle (another vehicle traveling ahead of the subject vehicle in the same lane, here and hereinafter) to stop and then resuming the travel, and/or performing an acceleration operation of increasing the set speed. The set/coast switch 173 is a switch for performing a setting operation of starting the autonomous speed control function at the speed when traveling and/or performing a coast operation of lowering the set speed. The cancel switch 174 is a switch for turning OFF the autonomous speed control function. The inter-vehicle distance adjustment switch 175 is a switch for setting the inter-vehicle distance from a preceding vehicle and is, for example, a switch for selecting one from a plurality of stages of settings, such as short distance/medium distance/long distance. The lane change assist switch 176 is a switch for accepting the start of a lane change when the control device 19 confirms the start of the lane change with the driver. The acceptance of a lane change proposed by the control device 19 can be canceled by pressing the lane change assist switch 176 longer than a predetermined time after accepting the start of the lane change.

Additionally or alternatively to the set of button switches illustrated in FIG. 2, the direction indicator lever for the direction indicators or switches of other onboard equipment 14 can be used as the input device 17. For example, a configuration can be adopted in which when the control device 19 proposes to determine whether or not to perform a lane change by the autonomous control, the driver turns on the switch for the direction indicators thereby to input the acceptance or permission for the lane change. Another configuration is also possible in which when the control device 19 proposes to determine whether or not to perform a lane change by the autonomous control, the driver operates the direction indicator lever for the direction indicators to perform a lane change toward the direction in which the direction indicator is operated, rather than the proposed lane change. The setting information input with the input device 17 is output to the control device 19.

The drive control device 18 controls travel of the subject vehicle in various aspects. For example, when the subject vehicle travels at a constant set speed using the autonomous speed control function, the drive control device 18 controls the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) and the brake operation for achieving the acceleration and deceleration and maintaining the traveling speed so that the speed of the subject vehicle becomes the set speed. Additionally or alternatively, when the subject vehicle travels to follow a preceding vehicle using the autonomous speed control function, the drive control device 18 controls the operation of the drive mechanism and the brake operation for achieving the acceleration/deceleration and the traveling speed so that the inter-vehicle distance between the subject vehicle and the preceding vehicle becomes a constant distance.

Additionally or alternatively, with the autonomous steering control function, the drive control device 18 executes the steering control of the subject vehicle by controlling the operation of the steering actuator in addition to the above-described operation of the drive mechanism and the brake operation. For example, when executing the lane keeping control using the autonomous steering control function, the drive control device 18 detects lane markers of a subject vehicle lane (a lane in which the subject vehicle travels, here and hereinafter) and controls the traveling position of the subject vehicle in the road width direction so that the subject vehicle travels at a certain position in the subject vehicle lane. Additionally or alternatively, when executing lane change assist using the lane change assist function, which will be described later, the drive control device 18 controls the traveling position of the subject vehicle in the road width direction so that the subject vehicle performs a lane change. Additionally or alternatively, when executing right or left turn assist using the autonomous steering control function, the drive control device 18 performs travel control for turning right or left at an intersection or the like. The drive control device 18 controls the travel of the subject vehicle in accordance with instructions from the control device 19, which will be described below. Any other known method can also be used as the travel control method executed by the drive control device 18.

The control device 19 includes a read only memory (ROM) that stores programs for controlling the travel of the subject vehicle, a central processing unit (CPU) that executes the programs stored in the ROM, a random access memory (RAM) that serves as an accessible storage device, etc. As substitute for or in addition to the CPU, a micro processing unit (MPU), a digital signal processor (DSP), an application specific integrated circuit (ASIC), a field programmable gate array (FPGA), or the like can be used as the operation circuit.

«Functions Achieved by Control Device 19»

The control device 19 executes the programs stored in the ROM using the CPU thereby to achieve a travel information acquisition function for acquiring information regarding a traveling state of the subject vehicle, a travel scene determination function for determining a travel scene of the subject vehicle, and an autonomous travel control function for autonomously controlling the traveling speed and/or steering of the subject vehicle. The functions of the control device 19 will be described below.

The travel information acquisition function of the control device 19 is a function for the control device 19 to acquire the travel information regarding the traveling state of the subject vehicle. For example, the control device 19 acquires as the travel information the external image information around the subject vehicle captured by the front camera, rear camera, and side cameras of the sensors 11. Additionally or alternatively, the control device 19 acquires as the travel information the detection results obtained by the front radar, rear radar, and side radars. Additionally or alternatively, the control device 19 acquires as the travel information the vehicle speed information of the subject vehicle detected by the vehicle speed sensor of the sensors 11, the attitude angle/yaw rate of the subject vehicle detected by the gyro sensor, the image information of the driver's face captured by the onboard camera, etc.

Additionally or alternatively, the control device 19 acquires as the travel information the current positional information of the subject vehicle from the subject vehicle position detection device 12. Additionally or alternatively, the control device 19 acquires as the travel information the set destination and the route to the destination, from the navigation device 15. Additionally or alternatively, the control device 19 acquires as the travel information the positional information of curved routes and the size of the curve (e.g., curvature or radius of curvature), merging points, branching points, tollgates, positions at which the number of lanes decreases, etc. from the map database 13. In addition, the control device 19 acquires as the travel information the information on an operation of the onboard equipment 14 performed by the driver from the onboard equipment 14. The above is the travel information acquisition function achieved by the control device 19.

The travel scene determination function of the control device 19 is a function for referring to a table stored in the ROM of the control device 19 to determine a travel scene in which the subject vehicle is traveling. In the table stored in the ROM of the control device 19, for example, a travel scene suitable for changing lanes or overtaking and determination conditions thereof are stored for each travel scene. The control device 19 refers to the table stored in the ROM and determines whether or not the travel scene of the subject vehicle is a travel scene suitable, for example, for changing lanes or overtaking.

It is assumed, for example, that four conditions of "there is a preceding vehicle ahead," "the vehicle speed of the preceding vehicle<the set vehicle speed of the subject vehicle," "the arrival at the preceding vehicle is within a predetermined time," and "the direction of lane change is not a lane change prohibition condition" are set as the determination conditions for a "scene of catching up with the preceding vehicle." In this case, the control device 19 determines whether or not the subject vehicle satisfies the above conditions, for example, based on the detection results by the front camera and/or front radar included in the sensors 11, the vehicle speed of the subject vehicle detected by the vehicle speed sensor, and the positional information of the subject vehicle obtained by the subject vehicle position detection device 12. When the above conditions are satisfied, the control device 19 determines that the subject vehicle is in the "scene of catching up with the preceding vehicle." The above is the travel scene determination function achieved by the control device 19.

The autonomous travel control function of the control device 19 is a function for the control device 19 to autonomously control the travel of the subject vehicle without depending on the driver's operation. The autonomous travel control function of the control device 19 includes an autonomous speed control function used for autonomously controlling the traveling speed of the subject vehicle and an autonomous steering control function used for autonomously controlling the steering of the subject vehicle. Autonomous control without depending on the driver's operation also includes performing some operations by the driver. The autonomous speed control function and the autonomous steering control function may be functions independent of each other or may also be functions associated with each other. The autonomous speed control function and autonomous steering control function of the present embodiment will be described below.

The autonomous speed control function is a function used, when detecting a preceding vehicle, for traveling to follow the preceding vehicle while performing the inter-vehicle distance control so as to maintain the inter-vehicle distance in accordance with the vehicle speed with an upper limit of the vehicle speed that is set by the driver. The autonomous speed control function is also a function used, when detecting no preceding vehicle, for performing constant speed traveling at a vehicle speed that is set by the driver. The former is also referred to as inter-vehicle distance control while the latter is also referred to as constant speed control. The autonomous speed control function may include a function for detecting the speed limit of a travel road from the road sign using the sensors 11 or acquiring the speed limit from the map information of the map database 13 and automatically adopting the speed limit as the set vehicle speed.

To activate the autonomous speed control function, the driver first operates the resume/acceleration switch 172 or set/coast switch 173 of the input device 17 illustrated in FIG. 2 to input a desired traveling speed. For example, when the set/coast switch 173 is pressed while the subject vehicle is traveling at 70 km/h, the current traveling speed is set without any modification, but if the speed desired by the driver is 80 km/h, the resume/acceleration switch 172 may be pressed a plurality of times to increase the set speed. The "+" mark attached to the resume/acceleration switch 172 indicates that it is a switch for increasing the set value. On the contrary, if the speed desired by the driver is 60 km/h, the set/coast switch 173 may be pressed a plurality of times to decrease the set speed. The "−" mark attached to the set/coast switch 173 indicates that it is a switch for decreasing the set value. The inter-vehicle distance desired by the driver may be selected, for example, from a plurality of stages of settings such as short distance/medium distance/long distance by operating the inter-vehicle distance adjustment switch 175 of the input device 17 illustrated in FIG. 2.

The constant speed control, in which the subject vehicle travels at a constant speed that is set by the driver, is executed when the front radar or the like of the sensors 11 detects that there is no preceding vehicle in the subject vehicle lane ahead. In the constant speed control, the drive control device 18 controls the operation of the drive mechanism such as the engine and the brake while feeding back the vehicle speed data obtained by the vehicle speed sensor so as to maintain the traveling speed which is set by the driver.

The inter-vehicle distance control, in which the subject vehicle travels to follow a preceding vehicle while performing the inter-vehicle distance control, is executed when the front radar or the like of the sensors 11 detects that there is a preceding vehicle in the subject vehicle lane ahead. In the inter-vehicle distance control, the drive control device 18 controls the operation of the drive mechanism such as the engine and the brake while feeding back the inter-vehicle distance data detected by the front radar so as to maintain the set inter-vehicle distance with a set upper limit of the traveling speed. If the preceding vehicle stops while the subject vehicle is traveling under the inter-vehicle distance control, the subject vehicle also stops following the preceding vehicle. If the preceding vehicle starts, for example, within 30 seconds after the subject vehicle stops, the subject vehicle also starts traveling to follow the preceding vehicle again by the inter-vehicle distance control. If the subject vehicle stops for more than 30 seconds, the subject vehicle does not start in an automated or autonomous manner even when the preceding vehicle starts, and after the preceding vehicle starts, the subject vehicle starts traveling to follow the preceding vehicle again by the inter-vehicle distance control when the resume/acceleration switch 172 is pressed or the accelerator pedal is depressed.

On the other hand, the autonomous steering control function is a function for controlling the operation of the steering actuator thereby to execute the steering control of the subject vehicle. This autonomous steering control function of the present embodiment includes: (1) a lane keeping function (lane width direction maintenance function) in which the steering is controlled so as to travel, for example, near the center of the lane to assist the driver's steering operation; (2) a lane change assist function in which when the driver operates the blinker lever, the steering is controlled to assist the steering wheel operation necessary for changing lanes; (3) an overtaking assist function in which when a vehicle slower than the set vehicle speed is detected ahead, a display is used for confirmation by the driver as to whether to perform an overtaking operation, and when the driver operates an acceptance switch, the steering is controlled to assist the overtaking operation; (4) a route traveling assist function in which when the driver inputs the destination to the navigation device or the like and arrives at a lane change point required to travel along the route, a display is used for confirmation by the driver as to whether to perform a lane change, and when the driver operates an acceptance switch, the steering is controlled to assist the lane change; and other functions. When the autonomous steering control is executed, the autonomous speed control is also executed at the same time, but the speed control may be executed by the driver's accelerator/brake operation.

When the subject vehicle autonomously travels in an intersection using the above-described autonomous travel control function, in particular, when the subject vehicle travels through an intersection in which the center lines of the subject vehicle lanes connected to the entrance and exit of the intersection are not on a straight line and are shifted in the right and left directions (such an intersection will be referred to as an offset intersection, hereinafter), a travel route for the subject vehicle in the intersection is preliminarily set, and the subject vehicle is controlled to pass through the intersection along the travel route. The prior document cited in the prior art describes setting virtual compartment lines in the intersection to extrapolate the subject vehicle lane between at the entrance and exit of the intersection and controlling the subject vehicle to keep lane along the virtual compartment lines thereby to execute the travel control in the offset intersection. Unfortunately, however, depending on the shape of the travel route (virtual compartment lines) set in the intersection, the subject vehicle and the oncoming vehicle face each other in the intersection or the subject vehicle faces the oncoming lane near the exit of the intersection, and the occupants may feel uneasy.

To cope with this, in the travel control device 1 for a vehicle according to the present embodiment, when autonomously traveling through an offset intersection, the subject vehicle is controlled to pass through the intersection at a lower speed than when the intersection is not an offset intersection. This eliminates or alleviates the uneasy feeling given to the occupants of the autonomously traveling vehicle. Embodiments for autonomously traveling through an offset intersection will be described below with reference to FIGS. 3 to 10. In the following description, examples will be described in which the present invention is applied to a travel scene that complies with traffic regulations such as Japanese traffic regulations that stipulate that vehicles travel on the left side while people pass on the right side. Note, however, that the present invention can also be applied to a travel scene that complies with traffic regulations that stipulate that vehicles travel on the right side while people pass on the left side, by reading the following description so as to replace the right and the left with each other. Moreover, the shapes of offset intersections are not limited to the examples illustrated in FIGS. 4A to 10, and the present invention can also be applied to offset intersections having various shapes, such as those in which the number of lanes connected to the entrance of the intersection and the number of lanes connected to the exit of the intersection are different.

First Embodiment

Figure 3:
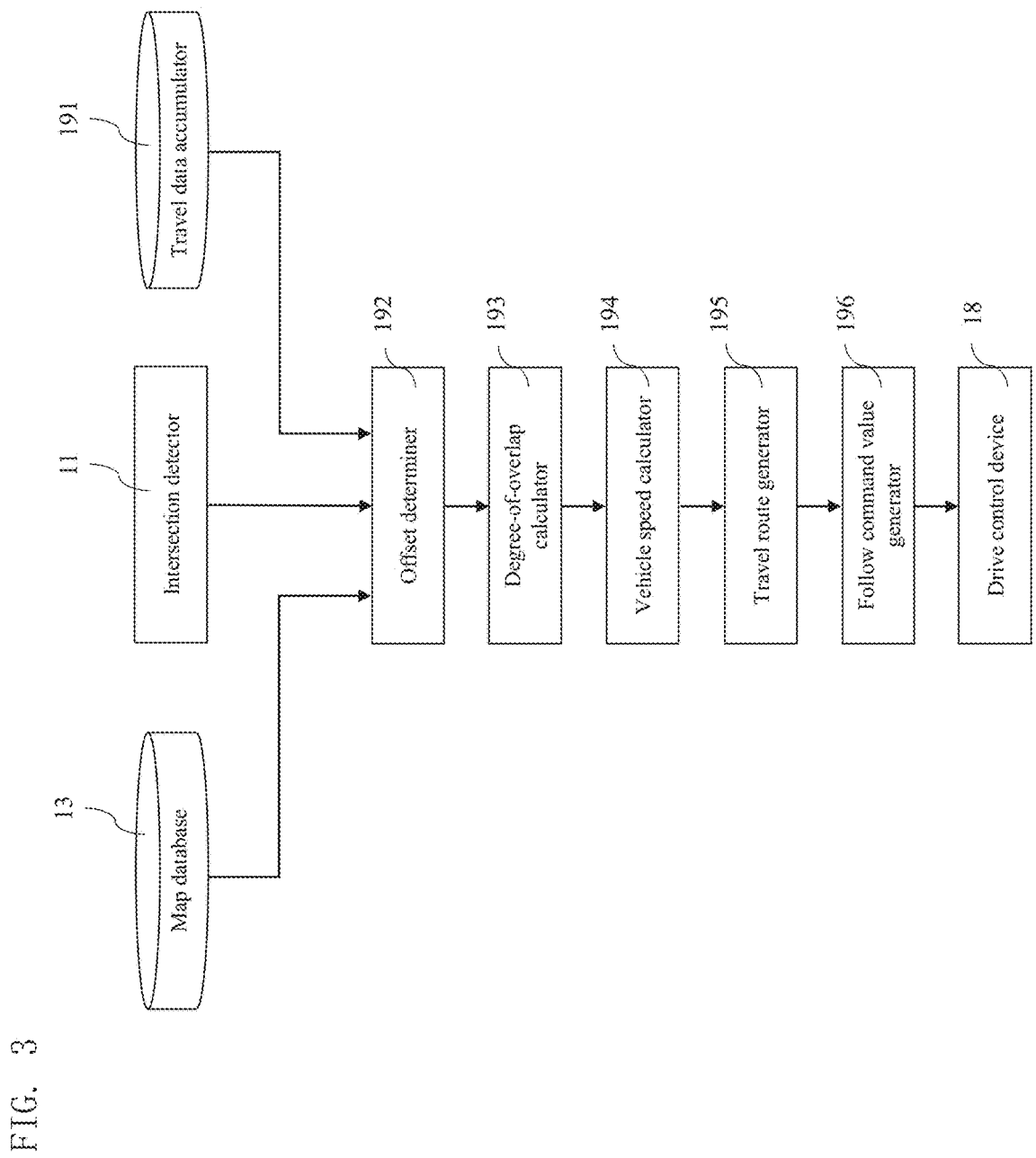
FIG. 3 is a block diagram illustrating an example of an offset intersection travel control unit included in the travel control device of FIG. 1.

FIG. 3 is a block diagram illustrating an example of an offset intersection travel control unit 190 included in the control device 19. The offset intersection travel control unit 190 of the present embodiment includes a travel data accumulator 191, an offset determiner 192, a degree-of-overlap calculator 193, a vehicle speed calculator 194, a travel route generator 195, and a follow command value generator 196, into which signals or information from the map database 13 and the sensors 11 such as the front camera as an intersection detector are incorporated, and the final command values are output to the drive control device 18. These parts constituting the offset intersection travel control unit 190 are represented for descriptive purposes, and are actually achieved by the programs stored in the ROM.

The travel data accumulator 191 is a database in which travel information (such as trajectories) of the vehicle on roads on which the vehicle has traveled in past times and its positional information (such as latitude and longitude) are associated and accumulated. The travel data accumulator 191 is provided, for example, in a server outside the vehicle and can be accessed by a specific user via the Internet line or the like. When the travel data accumulator 191 has a history of the travel trajectories, the vehicle can read out the data to travel autonomously. Additionally or alternatively, the past travel information can be updated by reflecting the current travel information, and the speed profile of the subject vehicle in the intersections described later can be stored. Note, however, that the information in the travel data accumulator 191 cannot be used if the intersection is the first intersection with no travel history or if the shape of the intersection is changed. Thus, the travel data accumulator 191 is not an essential configuration of the present invention and may be omitted as necessary.

The intersection detector 11 is achieved by the sensors 11 which detect an intersection on the travel route of the vehicle, and mainly includes a front camera that captures images ahead of the subject vehicle, side cameras that capture images on the right and left sides of the subject vehicle, etc. The intersection detector specifies the shape of an intersection from the intersection information acquired by the front camera and the like. The intersection information includes positional information (such as the latitude and longitude) of an intersection entrance IE and an intersection exit IO and information (such as the number of lanes and the lane widths) of lanes R1, R2, R3, and R4 connected to the intersection entrance IE and the intersection exit IO.

Figure 4A:
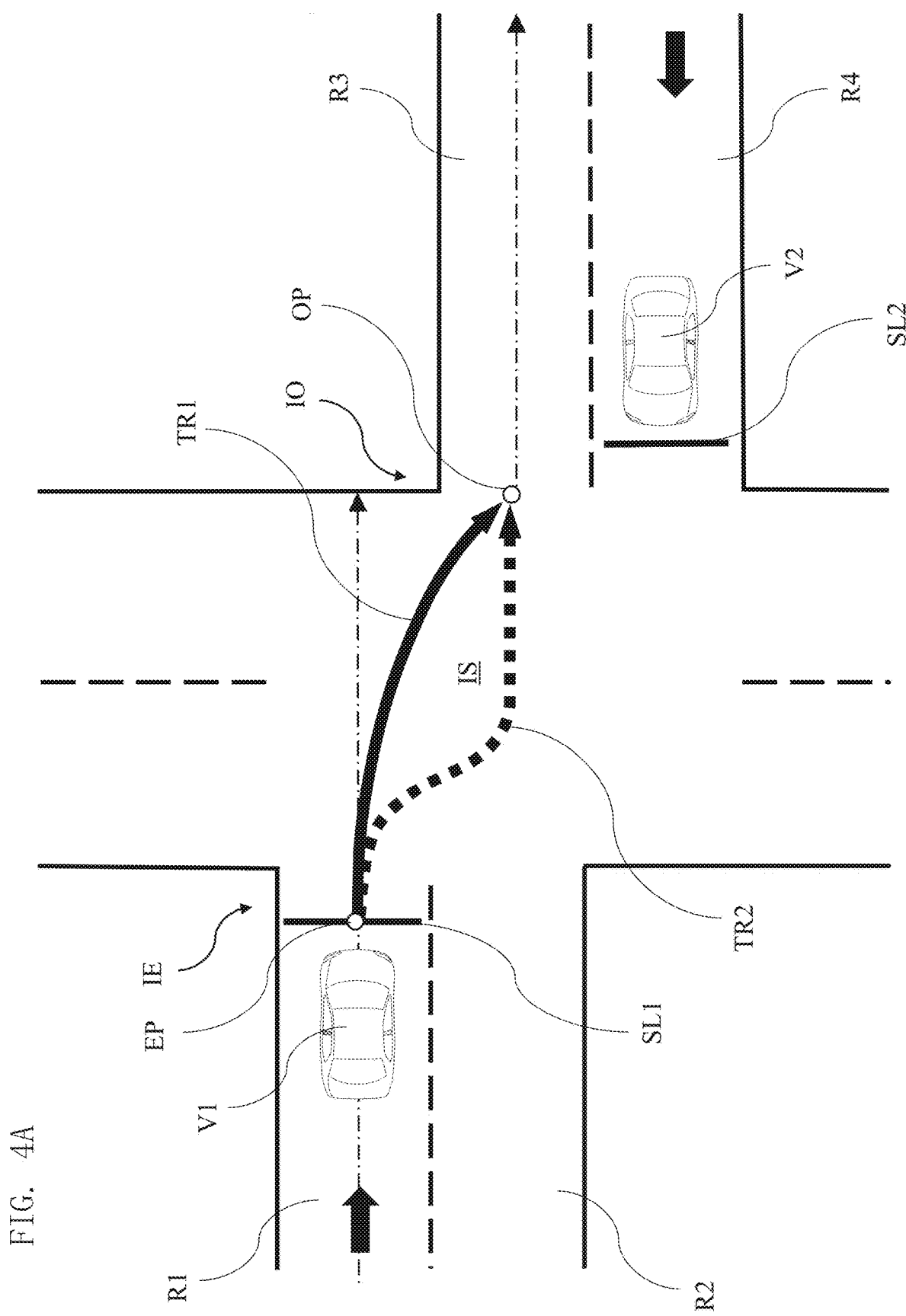
FIG. 4A is a plan view (part 1) illustrating an example of a scene of traveling through an offset intersection using the travel control device for a vehicle of the present invention.
Figure 4B:
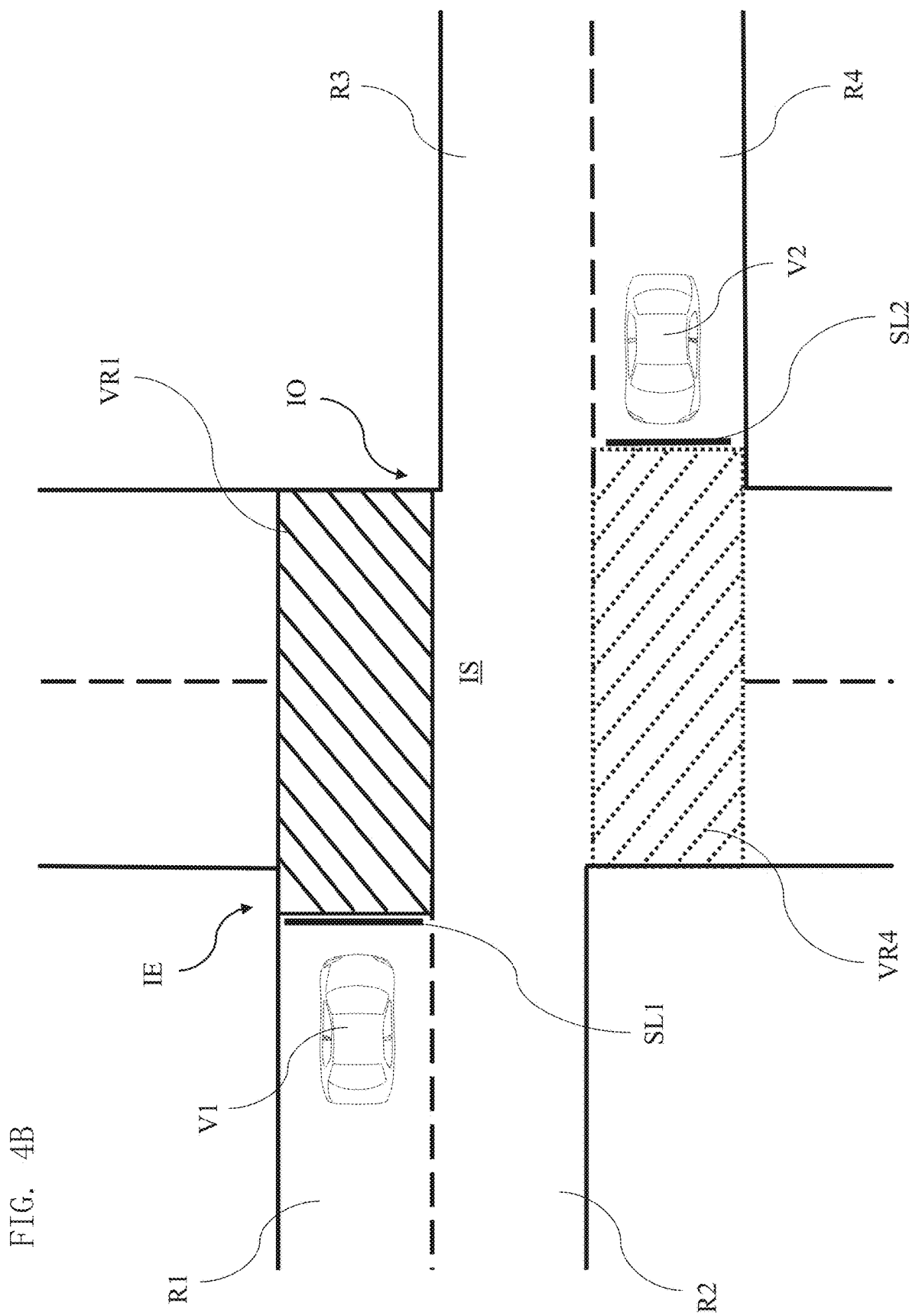
FIG. 4B is a plan view (part 2) illustrating an example of a scene of traveling through an offset intersection using the travel control device for a vehicle of the present invention.

FIGS. 4A and 4B are plan views illustrating an example of a scene in which a subject vehicle V1 autonomously travels through an intersection IS using the travel control device 1 for a vehicle of the present embodiment. The intersection IS illustrated in FIG. 4A is an offset intersection in which two-lane roads (left-hand traffic) extending in the vertical and horizontal directions of the figure cross each other and the lanes R3 and R4 connected to the intersection exit IO are offset in the right direction with respect to the lanes R1 and R2 connected to the intersection entrance IE. The intersection entrance IE and intersection exit IO as referred to herein mean the entrance and exit when viewed from the traveling direction of the subject vehicle V1 illustrated in the figure. It is assumed that the subject vehicle V1 travels straight in the subject vehicle lane R1 on the left side, enters the intersection IS from the intersection entrance IE, passes through the intersection IS along a travel route TR, and then passes through the intersection exit IO to enter the subject vehicle lane R3 in the right direction.

The intersection entrance IE refers to a region where the subject vehicle lane R1 on which the subject vehicle V1 travels is connected to the intersection IS. Although not particularly limited, the intersection entrance IE is, for example, a range from a line extended from a stop line SL1 of the subject vehicle lane R1 to the intersection IS. The intersection exit IO refers to a region where the subject vehicle lane R3 into which the subject vehicle V1 enters after passing through the intersection is connected to the intersection IS. Although not particularly limited, the intersection exit IO is, for example, a range from a line extended from a stop line SL2 of the oncoming lane (lane opposed to the subject vehicle lane, here and hereinafter) R4 to the intersection IS.

The offset determiner 192 determines whether or not the intersection IS for the subject vehicle V1 to seek to pass through is an offset intersection, based on the map information acquired from the map database 13, the travel information (such as travel trajectories) of the vehicle acquired from the travel data accumulator 191, and the intersection information acquired from the intersection detector. For example, as illustrated in FIG. 4A, when the center line of the subject vehicle lane R1 connected to the intersection entrance IE and the center line of the subject vehicle lane R3 connected to the intersection exit IO are not on a straight line (see the dashed-dotted arrows), the offset determiner 192 determines that the intersection IS for the subject vehicle V1 to seek to pass through is an offset intersection. The offset determiner 192 outputs the determination result to the degree-of-overlap calculator 193 together with the intersection information.

Whether or not the intersection is an offset intersection may be determined based on any one of the map information acquired from the map database 13, the vehicle travel information (such as travel trajectories) acquired from the travel data accumulator 191, and the intersection information acquired from the intersection detector or may also be determined by combining two or more such information items.

At the timing before the subject vehicle V1 arrives at the entrance of the intersection IS, the degree-of-overlap calculator 193 executes a calculation process of generating a virtual subject vehicle lane VR1 (see inside of the frame for solid oblique lines of FIG. 4B) obtained by extending the subject vehicle lane R1 straight from the intersection entrance IE into the intersection IS and a virtual oncoming lane VR4 (see inside of the frame for dashed oblique lines of FIG. 4B) obtained by extending the oncoming lane R4 straight from the intersection exit IO into the intersection IS. Then, the degree-of-overlap calculator 193 calculates the position at which the generated virtual subject vehicle lane VR1 and virtual oncoming lane VR4 overlap and the degree of overlap and outputs them to the vehicle speed calculator 194. As illustrated in FIG. 4B, depending on the positional relationship between the subject vehicle lane R1 connected to the intersection entrance IE and the oncoming lane R4 connected to the intersection exit IO, the virtual subject vehicle lane VR1 and the virtual oncoming lane VR4 may not overlap.

The vehicle speed calculator 194 generates a speed profile of the subject vehicle V1 in the intersection IS based on the calculation results of the position at which the virtual subject vehicle lane VR1 and the virtual oncoming lane VR4 overlap and the degree of overlap acquired from the degree-of-overlap calculator 193. The speed profile generated here is calculated so as to have a lower speed than the speed profile when the intersection is not an offset intersection. By setting the speed of the subject vehicle V1 in the intersection IS to a lower speed, it is possible to eliminate or alleviate the uneasy feeling given to the occupants when autonomously traveling through the offset intersection. The once generated speed profile may be stored in the travel data accumulator 191, and the preliminarily stored speed profile may be read and set when traveling through the same offset intersection for the second time or later.

FIG. 8 is a set of the plan view (upper diagram) illustrating the travel scene of FIG. 4B and graphs (middle and lower diagrams) each illustrating an example of the speed of the subject vehicle V1 and the position in the intersection IS. The vertical axis of the graphs represents the set speed of the subject vehicle V1. The horizontal axis of the graphs represents the positional relationship of the subject vehicle V1 in the intersection, and it is assumed that the position of the stop line SL1 of the subject vehicle lane R1 is P1, the position at which the subject vehicle lane R1 and the intersection IS connect is P2, the position at which the oncoming lane R4 and the intersection IS connect is P3, and the position of the stop line SL2 of the oncoming lane R4 is P4. When passing straight through an intersection other than offset intersections, the speed profile of the subject vehicle V1 is a constant speed with the speed limit of the subject vehicle lanes R1 and R3 as the upper limit, and the speed graph of the subject vehicle V1 is therefore a straight line at the positions P1, P2, P3, and P4 (not illustrated). On the other hand, the speed profile of the subject vehicle V1 in the present embodiment is such that after passing through the intersection entrance IE at a constant speed with the speed limit of the subject vehicle lane R1 as the upper limit, the subject vehicle V1 starts deceleration at a deceleration start position DS, releases the deceleration at a deceleration release position DE in the intersection IS, accelerates to a constant speed with the speed limit of the subject vehicle lane R3 as the upper limit, and then reaches the intersection exit IO. That is, the speed of the subject vehicle V1 is temporarily a lower speed between the positions P2 and P3 (middle diagram, upper graph) than the speed when passing through an intersection other than offset intersections. By setting the speed of the subject vehicle V1 traveling in the intersection IS to a lower speed in accordance with the speed profile thus set, it is possible to stabilize the traveling behavior of the subject vehicle V1 when passing through the offset intersection by autonomous traveling.

The speed profile in the intersection IS may be sufficient if the speed becomes a lower speed from the position P2 to the position P3. For example, the deceleration start position DS may be set at the position P2 and the deceleration release position DE may be set within the intersection IS, or the deceleration start position DS may be set within the intersection IS and the deceleration release position DE may be set at the position P3. Alternatively, the deceleration start position DS may be set at the position P2, and the deceleration release position DE may be set at the position P3. In this case, by setting the speed profile (lower diagram, lower graph) to decelerate from the speed limit of the subject vehicle lane R1 at the intersection entrance IE, pass through the intersection IS at a lower speed, and then release the deceleration at the intersection exit IO to return to the speed limit of the subject vehicle lane R3, the acceleration/deceleration in the intersection IS can be suppressed, and the subject vehicle can pass through the intersection IS at a constant lower speed. Additionally or alternatively, as will be described later, the speed and deceleration of the subject vehicle V1 may be changed in accordance with the position at which the virtual subject vehicle lane VR1 and the virtual oncoming lane VR4 overlap and/or the degree of overlap.

At the timing before the subject vehicle V1 arrives at the entrance of the intersection IS, the travel route generator 195 generates the travel route TR within the intersection IS from the intersection entrance IE to the intersection exit IO. Although the method of generating the travel route TR is not particularly limited, as illustrated in FIG. 4A for a travel route TR1, the travel route generator 195 may generate the travel route TR1 using a transition curve such as a trigonometric function, a polynomial function, a clothoid curve, a spline curve, or a Bezier curve that smoothly connects between position coordinates EP on the center line of the subject vehicle lane R1 at the intersection entrance IE and position coordinates OP on the center line of the subject vehicle lane R3 at the intersection exit IO. Alternatively, as illustrated in the same figure for a travel route TR2, the travel route generator 195 may generate the travel route TR2 so that the trajectory from the position coordinates EP into the intersection IS is formed in a curved shape provided with a small diameter portion and is then extended to reach the position coordinates OP in a straight line. The deceleration of the subject vehicle V1 when traveling along such a curved trajectory can be adopted as a means for achieving a lower speed in the above-described speed profile in the intersection IS. Other known methods can also be used.

The follow command value generator 196 calculates control command values that are actually output to the drive control device 18, from the speed profile in the intersection IS generated by the vehicle speed calculator 194 and the travel route TR generated by the travel route generator 195. Through controlling the longitudinal position based on the speed profile generated by the vehicle speed calculator 194 and controlling the lateral position based on the travel route TR generated by the travel route generator 195, the subject vehicle V1 is allowed to follow the travel route TR.

«Offset Intersection Travel Control Process»

Figure 11:
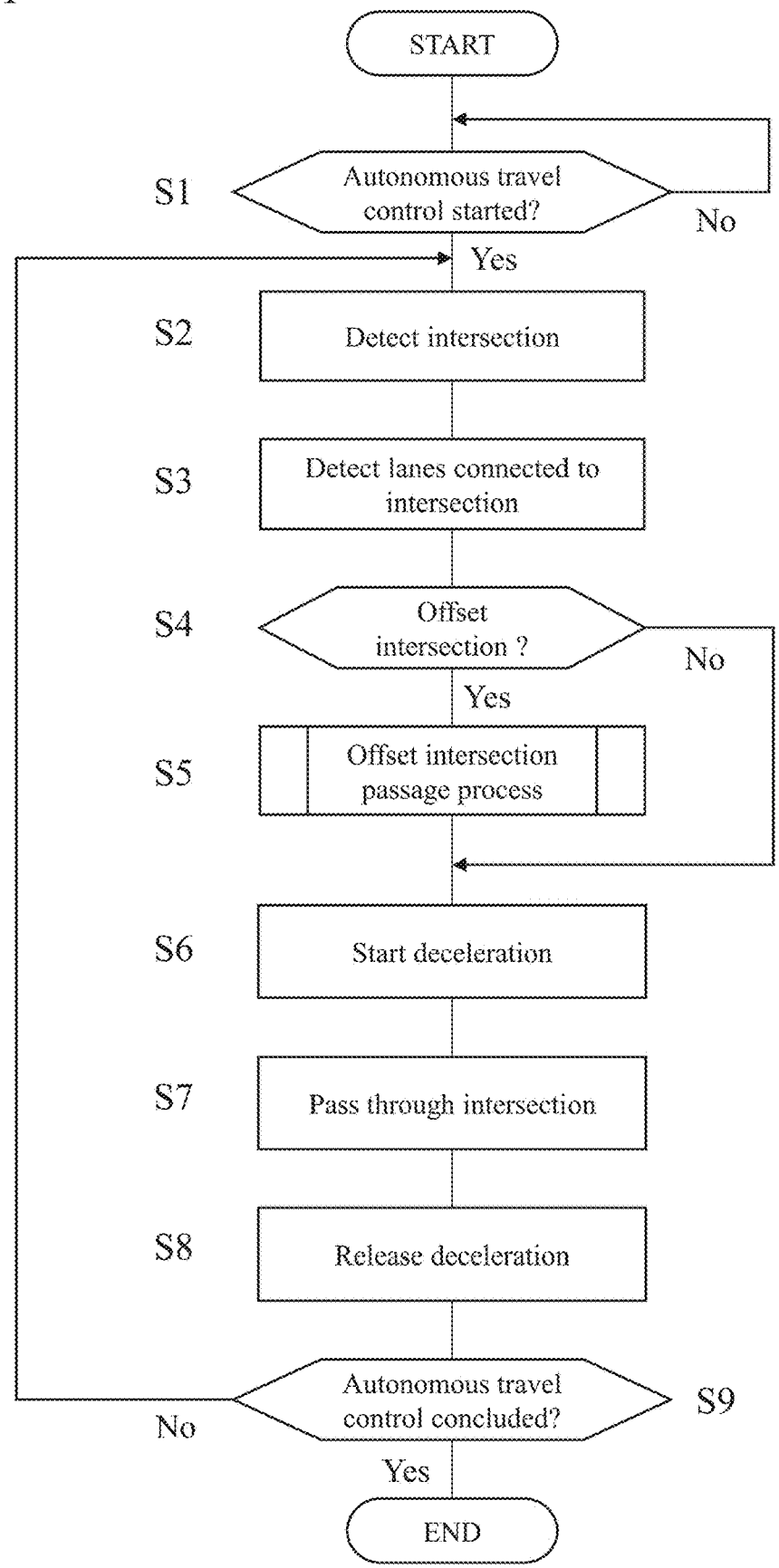
FIG. 11 is a flowchart illustrating an example of a control process executed by the offset intersection travel control unit of FIG. 3.
Figure 12:
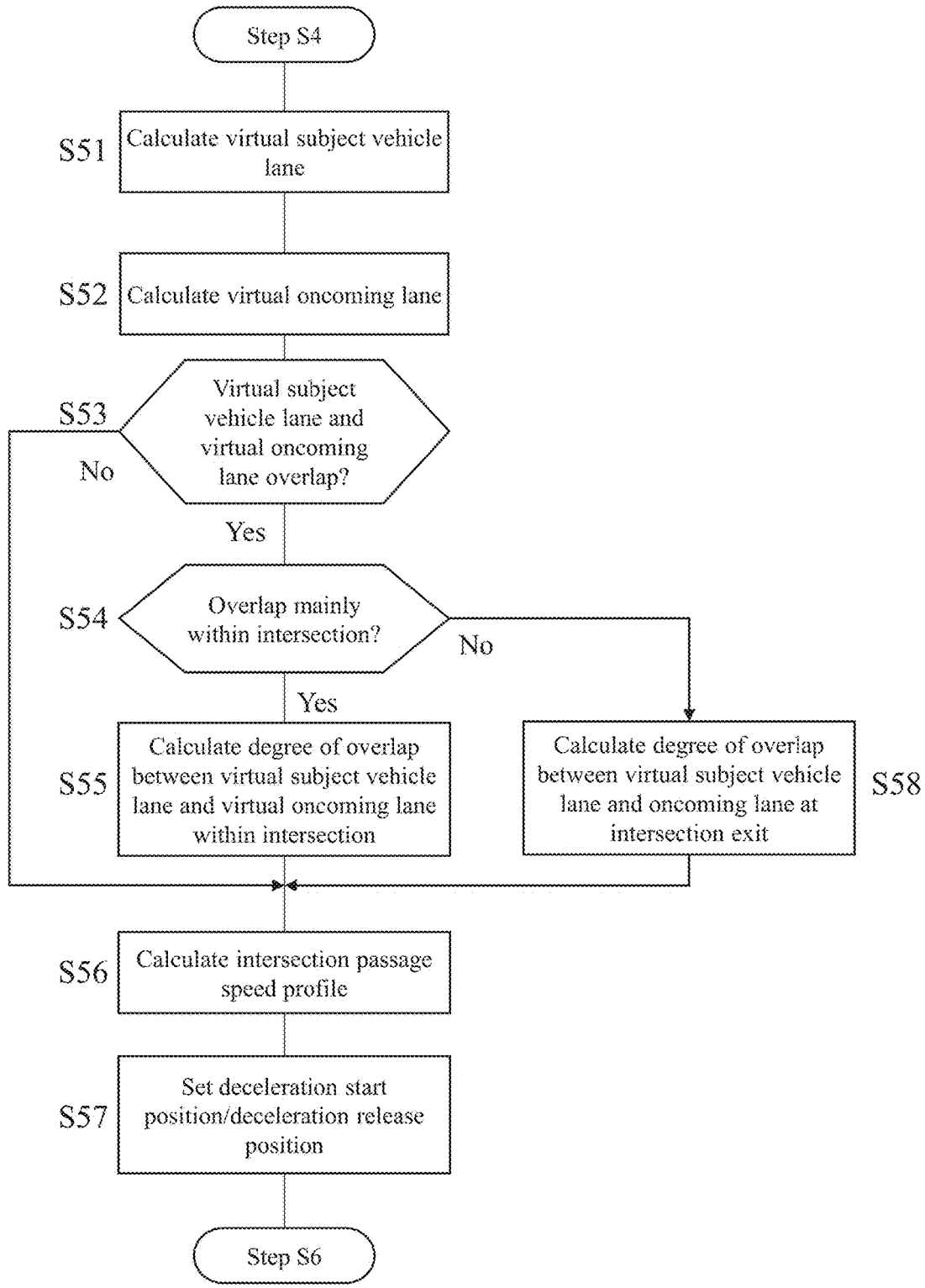
FIG. 12 is a flowchart illustrating an example of a subroutine executed in step S5 of FIG. 11.

The offset intersection travel control process according to the present embodiment will now be described with reference to FIGS. 11 and 12. FIG. 11 is a flowchart illustrating an example of the offset intersection travel control process executed by the control device 19 of the present embodiment. FIG. 12 illustrates an example of the subroutine of step S5 illustrated in FIG. 11. The travel control process described below is executed by the control device 19 at predetermined time intervals. In the following description, it is assumed that the control device 19 uses the autonomous travel control function to execute the autonomous speed control and the autonomous steering control and the lane keeping control is performed to control the traveling position of the subject vehicle in the road width direction so that the subject vehicle travels in the lane at the speed set by the driver.

In step S1 of FIG. 11, the control device 19 determines whether or not a start signal for the lane keeping control is input. The control device 19 repeats step S1 within a predetermined time until the start signal for the lane keeping control is input. When the start signal for the lane keeping control is input, the process proceeds to step S2.

In step S2, the control device 19 uses the map information of the map database 13 and the sensors 11 such as the front camera (intersection detector) to detect the intersection IS on the travel route of the subject vehicle V1. In the subsequent step S3, the control device 19 detects the information on the lanes connected to the intersection IS, and the process proceeds to step S4.

In step S4, the offset determiner 192 determines whether or not the intersection IS for the subject vehicle V1 to seek to pass through is an offset intersection based on the information on the lanes connected to the intersection IS detected in step S3. When a determination is made that the intersection is not an offset intersection, the process proceeds to step S6. On the other hand, when a determination is made that the intersection is an offset intersection, the process proceeds to step S5. For example, when the center line of the subject vehicle lane R1 connected to the intersection entrance IE and the center line of the subject vehicle lane R3 connected to the intersection exit IO are not on a straight line, the offset determiner 192 determines that the intersection IS for the subject vehicle V1 to seek to pass through is an offset intersection.

When the result of the determination in step S4 is that the intersection IS for the subject vehicle V1 to seek to pass through is an offset intersection, an offset intersection passage process is performed in step S5. This process of step S5 includes calculating the speed profile for passing through the intersection IS and setting the deceleration start position DS and the deceleration release position DE.

In the subsequent step S6, the control device 19 starts deceleration of the subject vehicle V1. When the offset intersection passage process is performed in step S5, the deceleration of the subject vehicle V1 is started at the deceleration start position DS set in step S5.

In step S7, the control device 19 controls the subject vehicle V1 to pass through the intersection IS along the travel route TR generated by the travel route generator 195, and the process proceeds to step S8. When the offset intersection passage process is performed in step S5, the subject vehicle V1 is controlled to travel with the speed profile calculated in step S5.

After the subject vehicle V1 passes through the intersection IS, in step S8, the control device 19 releases the deceleration of the subject vehicle V1. When the offset intersection passage process is performed in step S5, the deceleration of the subject vehicle V1 is released at the deceleration release position DE set in step S5. Then, the process proceeds to step S9, and if the lane keeping control is not concluded, the process returns to step S2, from which the above processes are repeated.

In step S5 of FIG. 11, the offset intersection passage process illustrated in FIG. 12 is executed. When the result of the determination in step S4 is that the intersection IS for the subject vehicle V1 to seek to pass through is an offset intersection, in step S51, the degree-of-overlap calculator 193 generates the virtual subject vehicle lane VR1 obtained by extending the subject vehicle lane R1, which is connected to the entrance of the intersection IS, straight from the intersection entrance IE. In the subsequent step S52, the degree-of-overlap calculator 193 generates the virtual oncoming lane VR4 obtained by extending the oncoming lane R4, which is connected to the exit of the intersection IS, straight from the intersection exit IO.

Then, in step S53, the degree-of-overlap calculator 193 determines whether or not the virtual subject vehicle lane VR1 and the virtual oncoming lane VR4 overlap. As illustrated in FIG. 4B, when the virtual subject vehicle lane VR1 and the virtual oncoming lane VR4 do not overlap, the process proceeds to step S56. On the other hand, as illustrated in FIGS. 5A to 7, when the virtual subject vehicle lane VR1 and the virtual oncoming lane VR4 overlap, the process proceeds to step S54, and the processes of steps S55 and S58 are performed. The processes of steps S55 and S58 will be described later.

In step S56, the vehicle speed calculator 194 generates a speed profile of the subject vehicle V1 within the intersection IS. The speed profile generated here is calculated so that the speed is lower than when the intersection is not an offset intersection. Then, in step S57, the vehicle speed calculator 194 sets the deceleration start position DS and the deceleration release position DE based on the speed profile generated in step S56.

As described above, according to the travel control method and travel control device 1 for a vehicle of the present embodiment, a determination is made whether or not the intersection IS for the subject vehicle V1 to seek to pass straight through is an offset intersection that is offset to the right or left with respect to the direction straight ahead of the subject vehicle V1, and when the intersection IS is an offset intersection, the subject vehicle V1 is controlled to pass through the intersection IS at a lower speed than when the intersection IS is not an offset intersection. This can eliminate or alleviate the uneasy feeling given to the occupants when autonomously traveling through the offset intersection.

Moreover, according to the travel control method and travel control device 1 for a vehicle of the present embodiment, a determination is made whether or not the intersection IS for the subject vehicle V1 to seek to pass straight through is an offset intersection that is offset to the right or left with respect to the direction straight ahead of the subject vehicle V1, and when the intersection IS is an offset intersection, the subject vehicle V1 is controlled to pass through the intersection IS at a lower speed than when the intersection IS is not an offset intersection; therefore, it is possible to stabilize the traveling behavior of the subject vehicle when passing through the offset intersection by autonomous traveling.

Furthermore, according to the travel control method and travel control device 1 for a vehicle of the present embodiment, when the subject vehicle V1 is controlled to pass through the intersection IS at a lower speed, the subject vehicle V1 starts deceleration at the intersection entrance IE and releases the deceleration at the intersection exit IO, and the acceleration/deceleration within the intersection IS can therefore be suppressed to allow the subject vehicle V1 to pass through the intersection IS at a constant lower speed. It is thus possible to further alleviate the uneasy feeling given to the occupants when autonomously traveling through the offset intersection.

Second Embodiment

The second embodiment of the present invention will then be described with reference to FIGS. 5A and 5B. The configuration of the offset intersection travel control unit 190 is the same as that of the first embodiment illustrated in FIG. 3, so the descriptions in the above-described embodiment will be borrowed for the blocks of the offset intersection travel control unit 190. The present embodiment illustrated in FIGS. 5A and 5B differs from the above first embodiment in that the virtual subject vehicle lane VR1 and the virtual oncoming lane VR4 generated within the intersection IS overlap. In the travel scene illustrated in FIG. 5A, the subject vehicle V1 enters the subject vehicle lane R3 in the right direction from the subject vehicle lane R1 in the left direction. That is, the pattern is such that the subject vehicle travels straight ahead in the subject vehicle lane R1 in the left direction, enters the intersection IS from the intersection entrance IE, passes through the intersection IS, and then passes through the intersection exit IO to enter the subject vehicle lane R3 in the right direction. On the other hand, the travel scene illustrated in FIG. 5B is a pattern in which the subject vehicle V1 enters the intersection IS from the subject vehicle lane R1 in the right direction and then enters the subject vehicle lane R3 in the left direction.

Figure 5A:
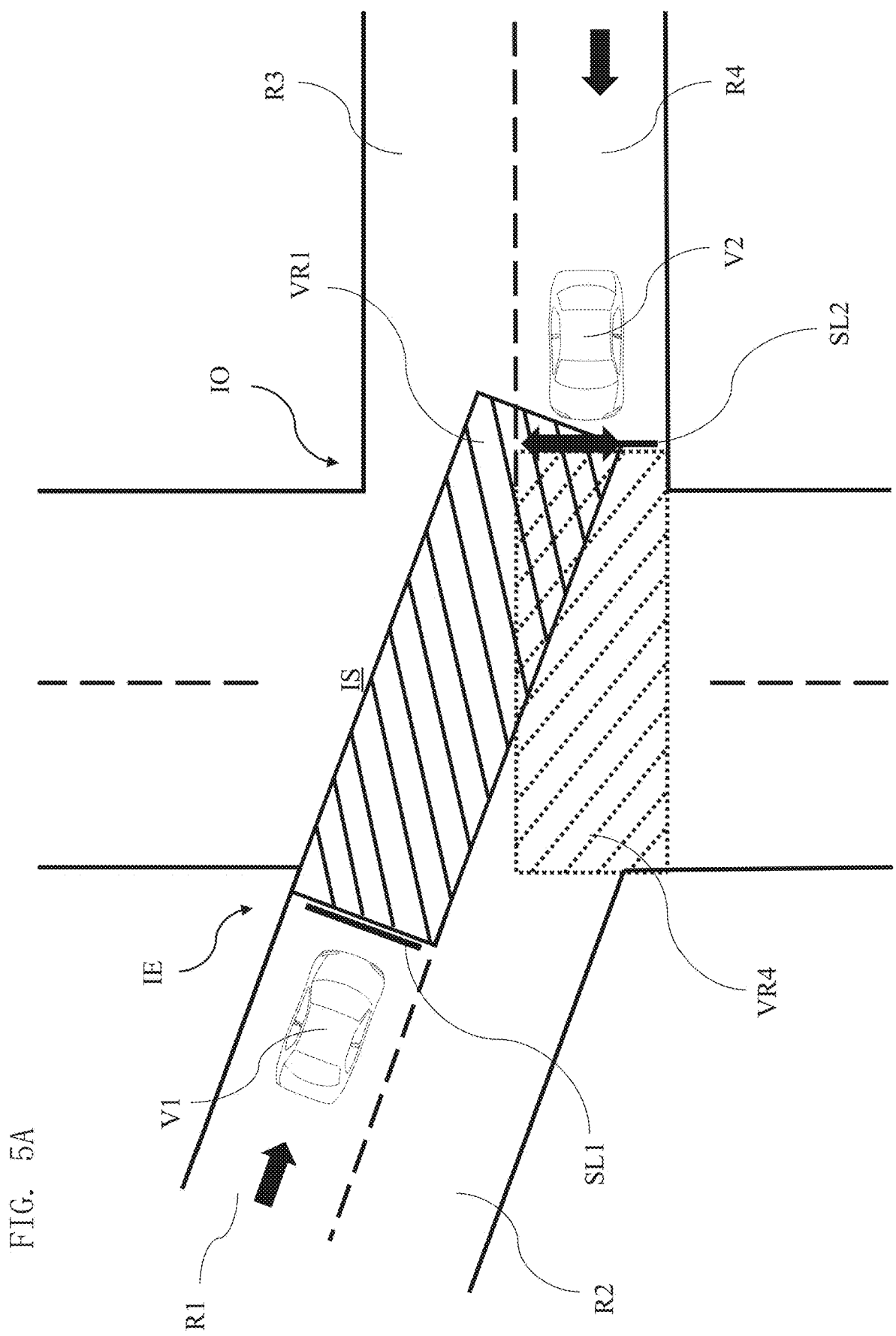
FIG. 5A is a plan view (part 1) illustrating another example of a scene of traveling through an offset intersection using the travel control device for a vehicle of the present invention.
Figure 5B:
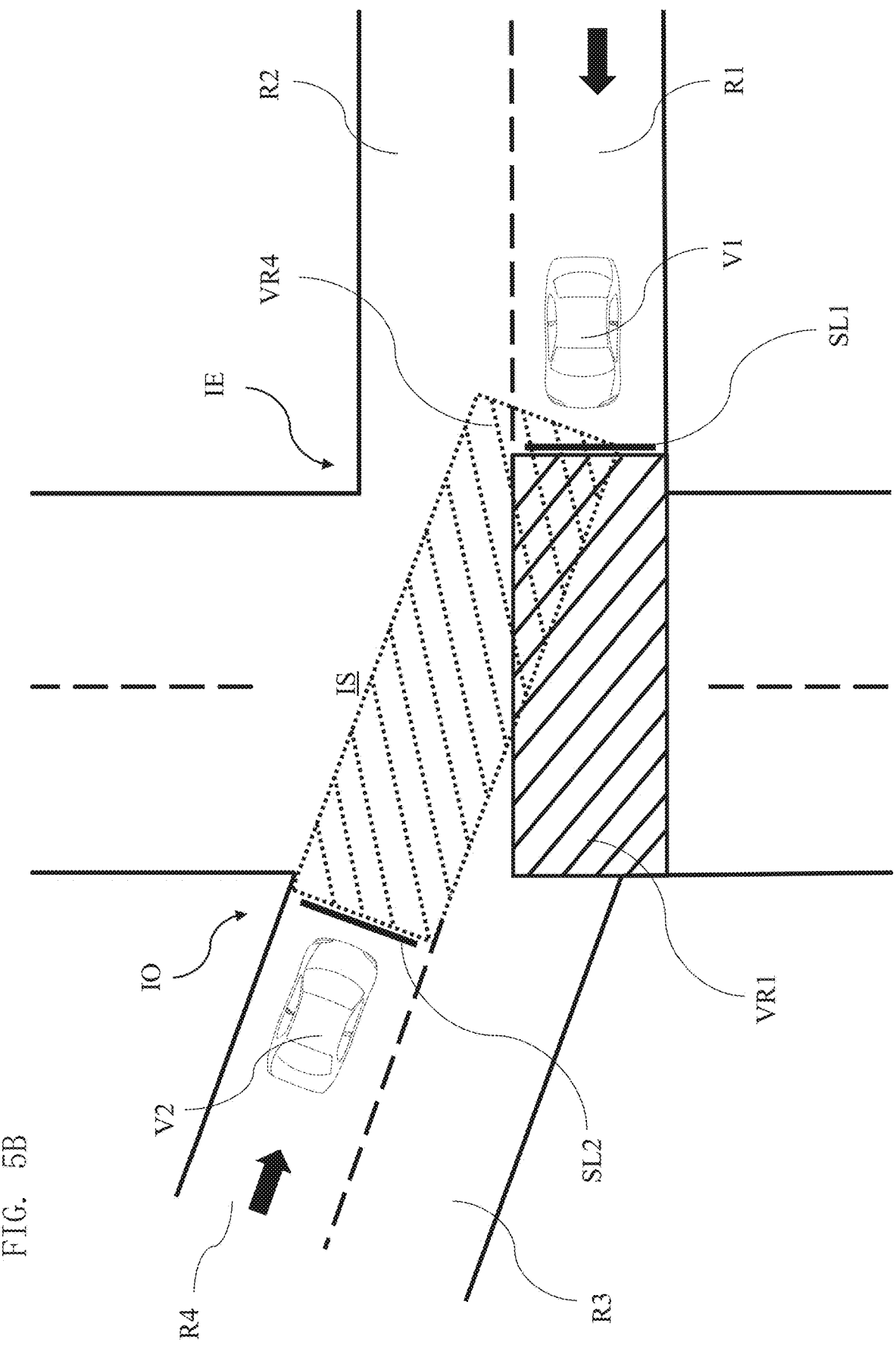
FIG. 5B is a plan view (part 2) illustrating another example of a scene of traveling through an offset intersection using the travel control device for a vehicle of the present invention.

Here, the shape of the intersection IS illustrated in FIGS. 5A and 5B is the same, but in the travel scene illustrated in FIG. 5A, the virtual subject vehicle lane VR1 and the virtual oncoming lane VR4 overlap mainly at the intersection exit IO. The virtual subject vehicle lane VR1 therefore crosses and overlaps the oncoming lane R4 at the intersection exit IO (see the black arrow). In such a case, if the subject vehicle V1 enters the intersection IS from the subject vehicle lane R1 and travels straight ahead, the subject vehicle V1 faces the oncoming lane R4 near the intersection exit IO, and the occupants therefore feel uneasy that the subject vehicle V1 may enter the oncoming lane R4. On the other hand, in the travel scene illustrated in FIG. 5B, the virtual subject vehicle lane VR1 and the virtual oncoming lane VR4 overlap mainly at the intersection entrance IE. In this case, the virtual subject vehicle lane VR1 does not overlap with the oncoming lane R4 at the intersection exit IO, and therefore the occupants do not feel uneasy that the subject vehicle V1 may enter the oncoming lane R4.

Thus, when the virtual subject vehicle lane VR1 overlaps with the oncoming lane R4 at the intersection exit IO, the uneasy feeling given to the occupants increases as the degree of overlap (width) increases, so the speed profile is generated for the subject vehicle V1 to pass through the intersection at a lower speed. That is, the subject vehicle V1 illustrated in FIG. 5A has a larger degree of overlap (width) between the virtual subject vehicle lane VR1 and the oncoming lane R4 at the intersection exit IO than the subject vehicle V1 illustrated in FIG. 5B, so the subject vehicle V1 illustrated in FIG. 5A is controlled to pass through the intersection at a lower speed than the subject vehicle V1 illustrated in FIG. 5B.

Then, referring again to FIG. 12, the processes of steps S53 to S58 in the offset intersection travel control process of the present embodiment will be described. The processes other than those in steps S53 to S58 are the same as in the offset intersection travel control process of the first embodiment and therefore are borrowed herein, and the detailed description will be omitted.

In step S53, the degree-of-overlap calculator 193 determines whether or not the virtual subject vehicle lane VR1 and the virtual oncoming lane VR4 overlap. The virtual subject vehicle lane VR1 is obtained by extending the subject vehicle lane R1, which is connected to the entrance of the intersection IS, straight from the intersection entrance IE, and the virtual oncoming lane VR4 is obtained by extending the oncoming lane R4, which is connected to the exit of the intersection IS, straight from the intersection exit IO. When the virtual subject vehicle lane VR1 and the virtual oncoming lane VR4 overlap, the process proceeds to step S54.

In the subsequent step S54, the degree-of-overlap calculator 193 determines whether or not the virtual subject vehicle lane VR1 and the virtual oncoming lane VR4 overlap mainly within the intersection IS. When the virtual subject vehicle lane VR1 and the virtual oncoming lane VR4 overlap mainly within the intersection IS, the process proceeds to step S55. On the other hand, when the virtual subject vehicle lane VR1 and the virtual oncoming lane VR4 do not overlap mainly within the intersection IS, the process proceeds to step S58. The process of step S55 will be described later.

When the result of the determination in step S54 is that the virtual subject vehicle lane VR1 and the virtual oncoming lane VR4 do not overlap mainly within the intersection IS, that is, the virtual subject vehicle lane VR1 and the virtual oncoming lane VR4 overlap mainly at the intersection exit IO, the degree-of-overlap calculator 193 calculates the degree of overlap between the virtual subject vehicle lane VR1 and the oncoming lane R4 at the intersection exit IO. Then, in the subsequent step S56, the speed profile of the subject vehicle V1 within the intersection IS is generated based on the degree of overlap between the virtual subject vehicle lane VR1 and the oncoming lane R4. More specifically, as the degree of overlap between the virtual subject vehicle lane VR1 and the oncoming lane R4 at the intersection exit IO increases, the profile is generated for the subject vehicle V1 to pass through the intersection at a lower speed.

As described above, according to the travel control method and travel control device 1 for a vehicle of the present embodiment, the degree of overlap between the virtual subject vehicle lane VR1 and the oncoming lane R4 at the intersection exit IO is calculated, and as the degree of overlap at the intersection exit IO increases, the subject vehicle V1 is controlled to pass through the intersection at a lower speed. The virtual subject vehicle lane VR1 is obtained by extending the subject vehicle lane R1, in which the subject vehicle V1 travels, straight from the intersection entrance IE. This can eliminate or alleviate the uneasy feeling given to the occupants that the subject vehicle may enter the oncoming lane near the exit of the offset intersection.

Third Embodiment

The third embodiment of the present invention will then be described with reference to FIGS. 6A to 6C. The configuration of the offset intersection travel control unit 190 is the same as that of the first embodiment illustrated in FIG. 3, so the descriptions in the above-described embodiment will be borrowed for the blocks of the offset intersection travel control unit 190. The present embodiment differs from the above-described second embodiment in that the virtual subject vehicle lane VR1 and the virtual oncoming lane VR4 overlap mainly within the intersection IS. In the travel scenes illustrated in FIGS. 6A to 6C, it is assumed that the subject vehicle V1 enters the intersection IS from the subject vehicle lane R1 in the left direction, passes through the intersection IS, and then passes through the intersection exit IO to enter the subject vehicle lane R3 in the right direction.

Figure 6A:
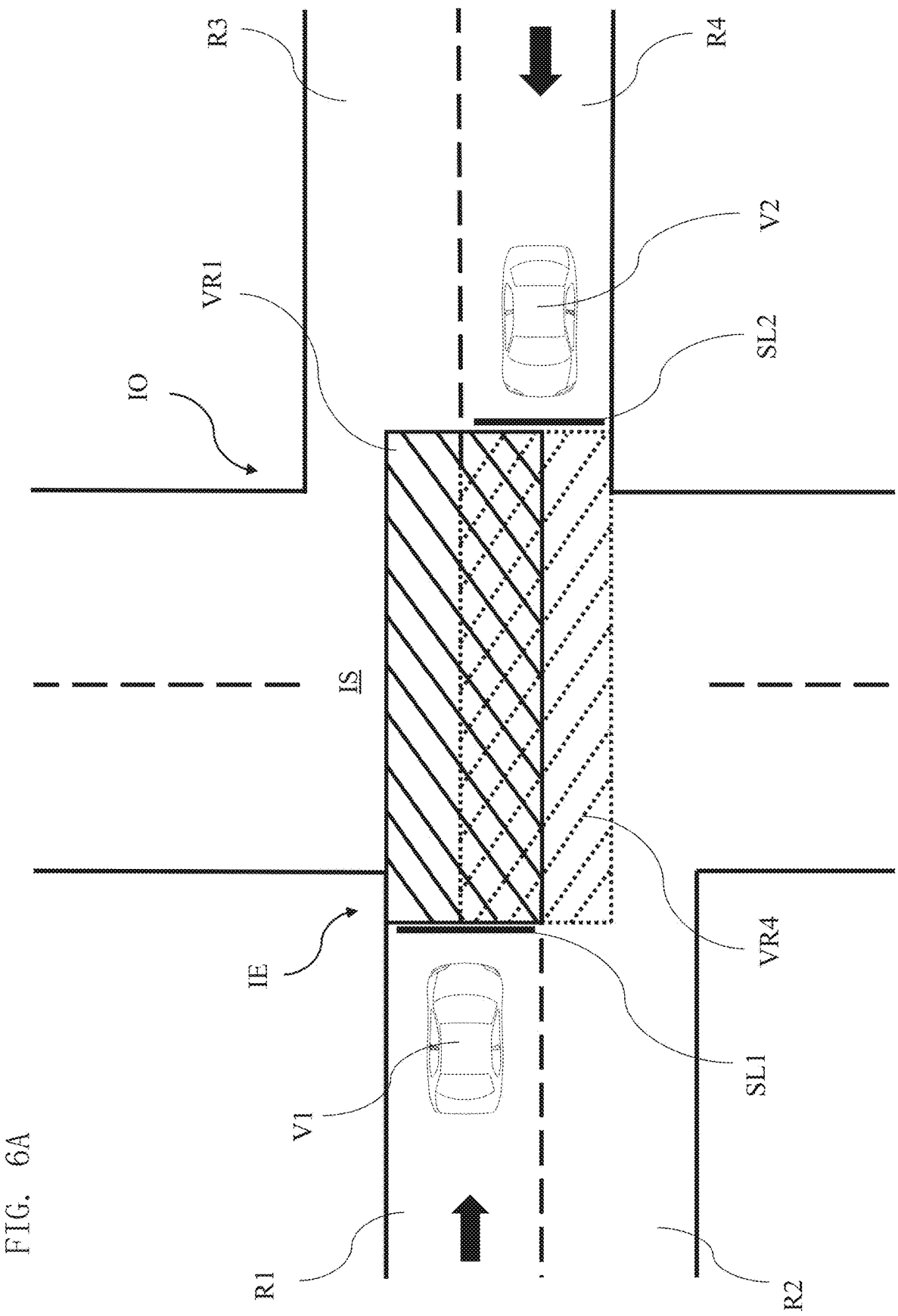
FIG. 6A is a plan view (part 1) illustrating still another example of a scene of traveling through an offset intersection using the travel control device for a vehicle of the present invention.

Here, the shape of the intersection IS illustrated in FIG. 6A is that of an intersection in which the subject vehicle lane R3 at the intersection exit IO is offset to the left by about half the lane width with respect to the subject vehicle lane R1 at the intersection entrance IE. On the other hand, the shape of the intersection IS illustrated in FIG. 6B is that of an intersection in which the subject vehicle lane R3 at the intersection exit IO is offset to the left by about the same extent as the lane width with respect to the subject vehicle lane R1 at the intersection entrance IE.

As illustrated in FIG. 6A, when the shape of the intersection IS is offset to the left by about half the lane width, the degree of overlap between the virtual subject vehicle lane VR1 and the virtual oncoming lane VR4 is also half the lane width. On the other hand, as illustrated in FIG. 6B, when the shape of the intersection IS is offset to the left by about the same extent as the lane width, the virtual subject vehicle lane VR1 and the virtual oncoming lane VR4 overlap over the entire region. In this case, if the subject vehicle V1 enters the intersection IS from the subject vehicle lane R1 and travels straight ahead, the subject vehicle V1 faces an oncoming vehicle V2 entering from the oncoming lane R4, and the occupants therefore feel uneasy that the subject vehicle V1 may interfere with the oncoming vehicle V2. Furthermore, as the degree of overlap (area) between the virtual subject vehicle lane VR1 and the virtual oncoming lane VR4 increases, the uneasy feeling given to the occupants becomes stronger. Thus, when the virtual subject vehicle lane VR1 and the virtual oncoming lane VR4 overlap mainly within the intersection IS, the uneasy feeling given to the occupants becomes strong as the degree of overlap (area) increases, so the speed profile is generated for the subject vehicle V1 to pass through the intersection at a lower speed.

Like the shape illustrated in FIG. 6A, the shape of the intersection IS illustrated in FIG. 6C is that of an intersection in which a subject vehicle lane R3a at the intersection exit IO is offset to the left by about half the lane width with respect to a subject vehicle lane R1a at the intersection entrance IE. The difference is the lane width, and the lane widths of the subject vehicle lanes R1a and R3a and oncoming lanes R2a and R4a illustrated in FIG. 6C are narrower than those of the subject vehicle lanes R1 and R3 and oncoming lanes R2 and R4 illustrated in FIG. 6A. In both cases, the degree of overlap (area) between the virtual subject vehicle lane VR1 and the virtual oncoming lane VR4 is about half the lane width. As illustrated in FIG. 6C, however, as the lane width of the subject vehicle lane R1a becomes narrower, the width of a region in which the virtual subject vehicle lane VR1 and the virtual oncoming lane VR4 do not overlap also becomes narrower. In the subject vehicle lane R1, as the width of the region in which the virtual subject vehicle lane VR1 and the virtual oncoming lane VR4 do not overlap becomes narrower, the subject vehicle V1 and the oncoming vehicle V2 become closer, so the uneasy feeling given to the occupants becomes stronger. For this reason, as the width of the subject vehicle lane R1 at the intersection entrance IE becomes narrower, the speed profile is generated for the subject vehicle V1 to pass through the intersection at a lower speed.

Then, referring again to FIG. 12, the processes of steps S55 to S57 in the offset intersection travel control process of the present embodiment will be described. The processes other than those in steps S55 to S57 are the same as in the offset intersection travel control process of the second embodiment and therefore are borrowed herein, and the detailed description will be omitted.

When the result of the determination in step S54 is that the virtual subject vehicle lane VR1 and the virtual oncoming lane VR4 overlap mainly within the intersection IS, the process proceeds to step S55, in which the degree of overlap between the virtual subject vehicle lane VR1 and the virtual oncoming lane VR4 within the intersection IS is calculated. The degree of overlap between the virtual subject vehicle lane VR1 and the virtual oncoming lane VR4 may be calculated using the area of the region in which the virtual subject vehicle lane VR1 and the virtual oncoming lane VR4 overlap or may also be calculated using the width of the region in which the virtual subject vehicle lane VR1 and the virtual oncoming lane VR4 overlap.

In the subsequent step S56, the vehicle speed calculator 194 generates the speed profile of the subject vehicle V1 within the intersection IS based on the degree of overlap between the virtual subject vehicle lane VR1 and the virtual oncoming lane VR4. More specifically, as the degree of overlap between the virtual subject vehicle lane VR1 and the virtual oncoming lane VR4 increases, the vehicle speed calculator 194 generates the profile for the subject vehicle V1 to pass through the intersection at a lower speed. In addition, as the width of the subject vehicle lane R1 at the intersection entrance IE becomes narrower, the vehicle speed calculator 194 generates the profile for the subject vehicle V1 to pass through the intersection at a lower speed.

As described above, according to the travel control method and travel control device 1 for a vehicle of the present embodiment, the degree of overlap between the virtual subject vehicle lane VR1 and the virtual oncoming lane VR4 within the intersection IS is calculated, and as the degree of overlap within the intersection IS increases, the subject vehicle V1 is controlled to pass through the intersection at a lower speed. The virtual subject vehicle lane VR1 is obtained by extending the subject vehicle lane R1, in which the subject vehicle V1 travels, straight from the intersection entrance IE while the virtual oncoming lane VR4 is obtained by extending the oncoming lane R4 straight from the intersection exit IO. This can eliminate or alleviate the uneasy feeling given to the occupants that the subject vehicle may interfere with the oncoming vehicle in the offset intersection.

Moreover, according to the travel control method and travel control device 1 for a vehicle of the present embodiment, as the width of the subject vehicle lane R1 at the intersection entrance IE becomes narrower, the subject vehicle is controlled to pass through the intersection at a lower speed, and it is therefore possible to further alleviate the uneasy feeling given to the occupants that the subject vehicle may interfere with the oncoming vehicle in the offset intersection.

Fourth Embodiment

The fourth embodiment of the present invention will then be described with reference to FIGS. 7 and 9A to 10. The configuration of the offset intersection travel control unit 190 is the same as that of the first embodiment illustrated in FIG. 3, so the descriptions in the above-described embodiment will be borrowed for the blocks of the offset intersection travel control unit 190. The present embodiment differs from the above-described third embodiment in that the degree of overlap between the virtual subject vehicle lane VR1 and the virtual oncoming lane VR4 within the intersection IS increases from the intersection entrance IE to the intersection exit IO, rather than being uniform.

Figure 7:
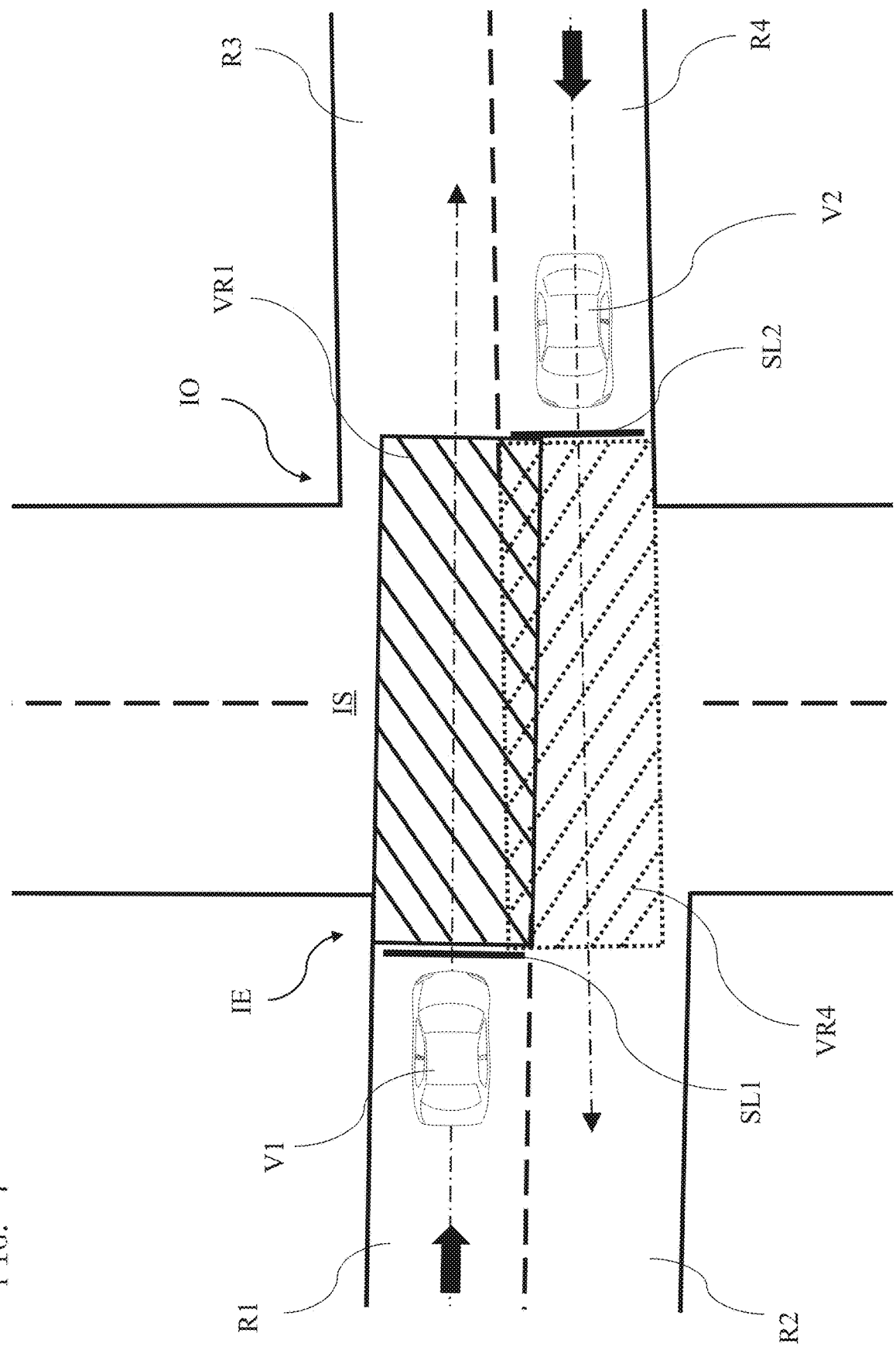
FIG. 7 is a plan view illustrating yet another example of a scene of traveling through an offset intersection using the travel control device for a vehicle of the present invention.
Figure 9A:
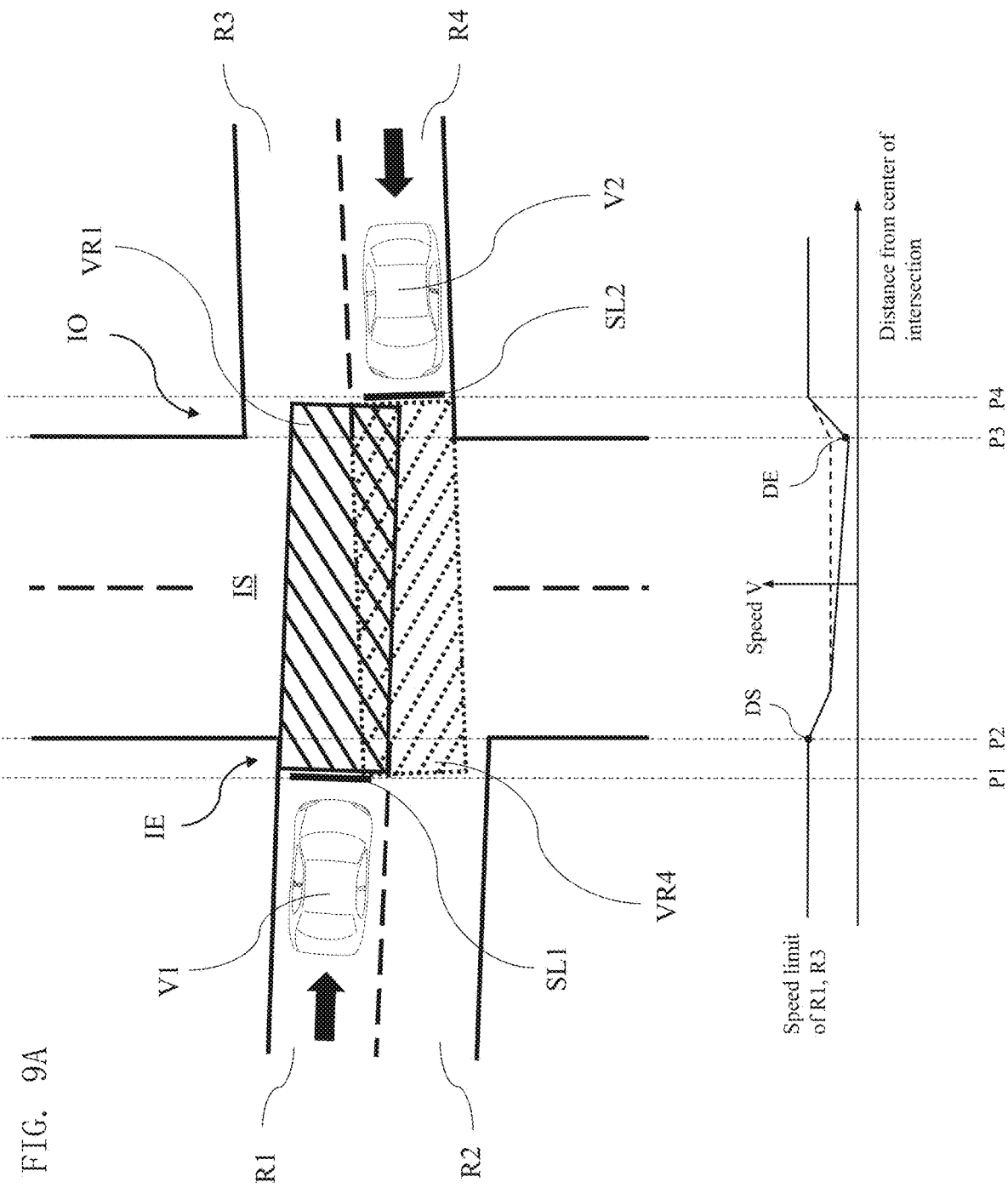
FIG. 9A is a set of the plan view (upper diagram) illustrating the travel scene of FIG. 7 and a graph (lower diagram) illustrating an example of the speed of the subject vehicle and the position in the intersection.
Figure 9B:
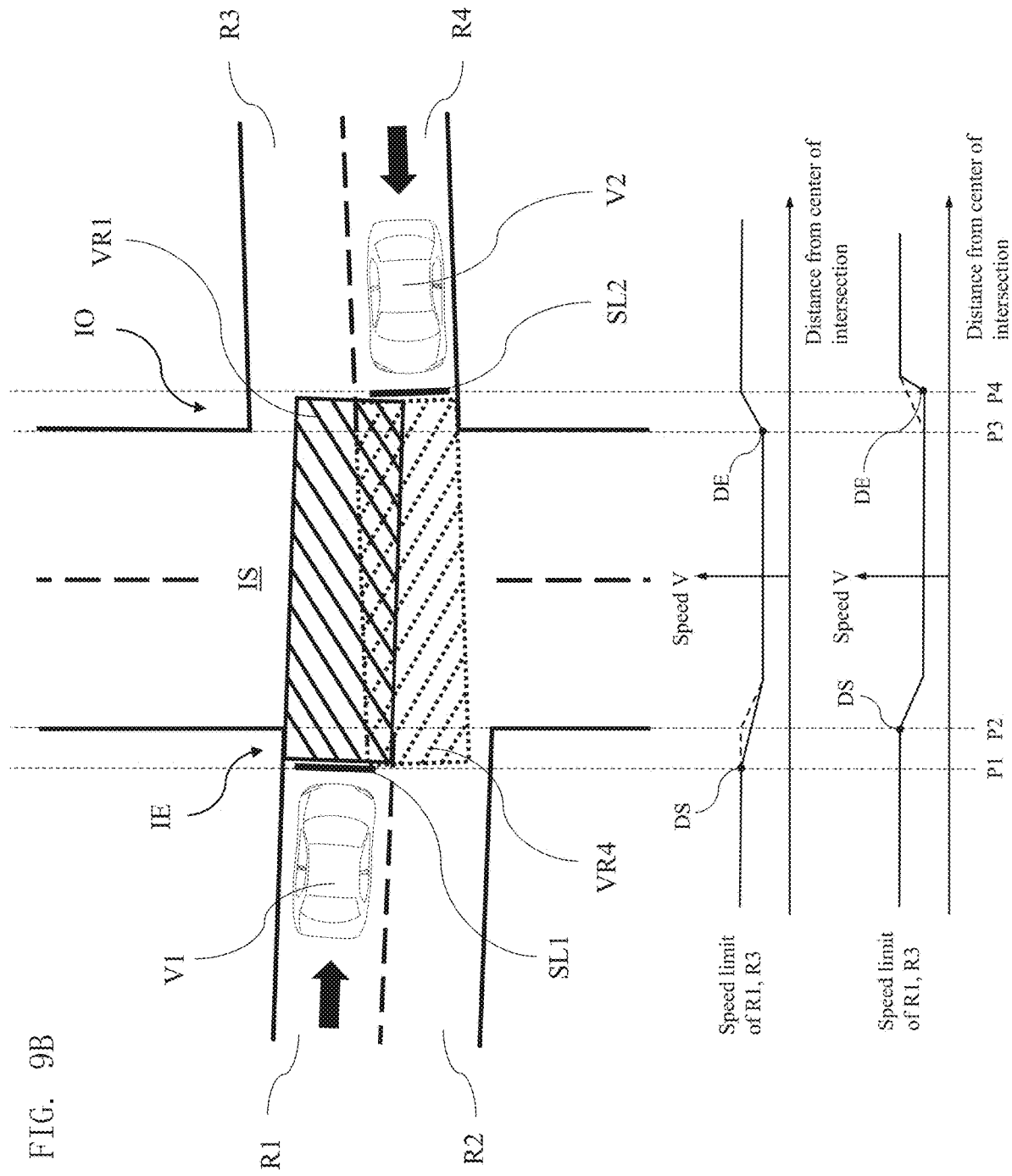
FIG. 9B is a set of the plan view (upper diagram) illustrating the travel scene of FIG. 7 and graphs (middle and lower diagrams) each illustrating another example of the speed of the subject vehicle and the position in the intersection.
Figure 10:
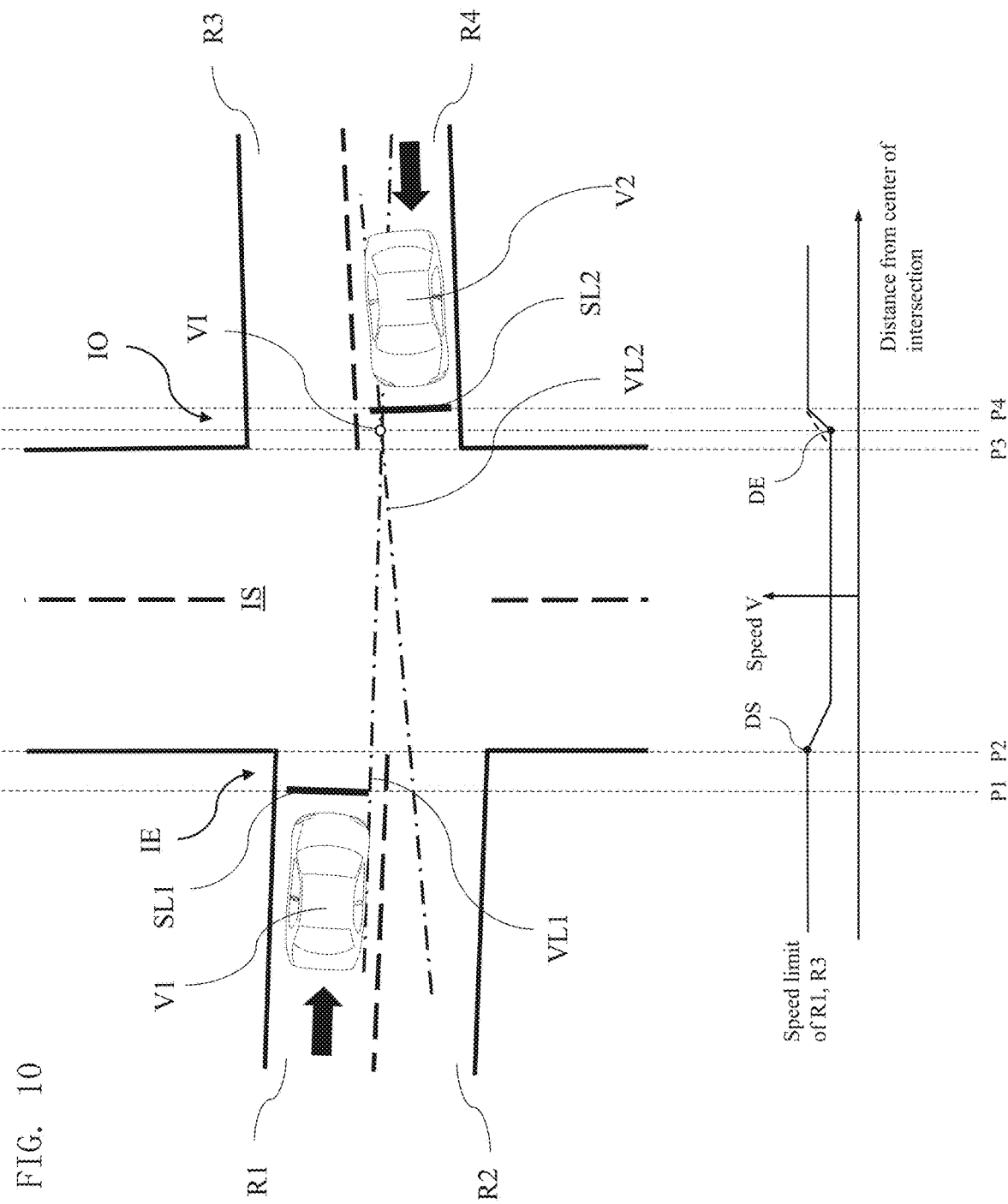
FIG. 10 is a set of the plan view (upper diagram) illustrating the travel scene of FIG. 7 and a graph illustrating still another example of the speed of the subject vehicle and the position in the intersection.

FIG. 7 is a plan view illustrating an example of a scene of traveling through an offset intersection according to the present invention, and FIGS. 9A to 10 are each a set of the plan view of the travel scene of FIG. 7 (upper diagram) and a graph or graphs illustrating an example of the speed of the subject vehicle V1 and the position in the intersection IS. In the travel scene illustrated in FIG. 7, it is assumed that the subject vehicle V1 enters the intersection IS from the subject vehicle lane R1 in the left direction, passes through the intersection IS, and then passes through the intersection exit IO to enter the subject vehicle lane R3 in the right direction.

As illustrated in FIG. 7, the center line of the subject vehicle lane R1 connected to the intersection entrance IE is inclined downward to the right with respect to the intersection IS while the center line of the oncoming lane R4 connected to the intersection exit IO is inclined downward to the left with respect to the intersection IS. Accordingly, the degree of overlap between the virtual subject vehicle lane VR1 and the virtual oncoming lane VR4 within the intersection IS increases from the intersection entrance IE toward the intersection exit IO. In this case, as the subject vehicle V1 enters the intersection IS from the subject vehicle lane R1 and travels straight ahead, the width facing the oncoming vehicle V2 entering from the oncoming lane R4 increases, so the uneasy feeling given to the occupants that the subject vehicle V1 may interfere with the oncoming vehicle V2 gradually increases. Therefore, when the degree of overlap between the virtual subject vehicle lane VR1 and the virtual oncoming lane VR4 increases from the intersection entrance IE toward the intersection exit IO, the vehicle speed calculator 194 generates the speed profile for the subject vehicle V1 to pass through the intersection IS at a lower speed while decelerating (step S56 of FIG. 12).

The vertical axis of the graph illustrated in the lower diagram of FIG. 9A represents the set speed of the subject vehicle V1. The horizontal axis of the graphs represents the positional relationship of the subject vehicle V1 in the intersection, and it is assumed that the position of the stop line SL1 of the subject vehicle lane R1 is P1, the position at which the subject vehicle lane R1 and the intersection IS connect is P2, the position at which the oncoming lane R4 and the intersection IS connect is P3, and the position of the stop line SL2 of the oncoming lane R4 is P4. In contrast to the speed profile (dashed line graph) for the subject vehicle to pass through from the position P2 to the position P3 at a constant lower speed, the speed profile (solid line graph) of the present embodiment is such that the subject vehicle decelerates as the degree of overlap between the virtual subject vehicle lane VR1 and the virtual oncoming lane VR4 increases.

In addition to this, in the present embodiment, the deceleration start position DS and the deceleration release position DE are set in accordance with the position at which the degree of overlap between the virtual subject vehicle lane VR1 and the virtual oncoming lane VR4 increases (step S57 of FIG. 12). More specifically, as illustrated in the middle diagram of FIG. 9B, the deceleration start position DS set at the position P2 is changed to the position P1 at which the degree of overlap between the virtual subject vehicle lane VR1 and the virtual oncoming lane VR4 is minimized (upper graph). This allows the subject vehicle to enter the intersection IS with a slower deceleration (solid line graph) than the speed profile (dashed line graph) in which the deceleration start position DS is set to the position P2, and it is therefore possible to further alleviate the uneasy feeling given to the occupants.

As for the deceleration release position DE, as illustrated in the lower diagram of FIG. 9B, the deceleration release position DE set at the position P3 is changed to the position P4 at which the degree of overlap between the virtual subject vehicle lane VR1 and the virtual oncoming lane VR4 is maximized (lower graph). This allows the subject vehicle to pass through the intersection IS while maintaining a lower speed for a longer time (solid line graph) than the speed profile (broken line graph) in which the deceleration release position DE is set to the position P3, and it is therefore possible to further alleviate the uneasy feeling given to the occupants.

Furthermore, as illustrated in the lower diagram of FIG. 10, the deceleration release position DE may be set to the position of an intersection point V1 between a first virtual line VL1 obtained by extending the side edge of the subject vehicle V1 on the oncoming lane R2 side straight from the intersection entrance IE and a second virtual line VL2 obtained by extending the side edge of the oncoming vehicle V2 on the subject vehicle lane R3 side straight from the intersection exit IO. The intersection point V1 is a position at which the right end of the subject vehicle V1 and the right end of the oncoming vehicle V2 are closest to each other, and the uneasy feeling given to the occupants becomes strong. The subject vehicle V1 can travel through the intersection IS while maintaining a lower speed for a longer time than the speed profile (dashed line graph) in which the deceleration release position DE is set to the position P3, and can release the deceleration after passing through the intersection point V1 at which the subject vehicle V1 and the oncoming vehicle V2 are closest to each other (solid line graph), and it is therefore possible to further alleviate the uneasy feeling given to the occupants.

The settings of the deceleration start position DS and deceleration release position DE in the present embodiment may be used in combination as appropriate, and the speed profile for the subject vehicle V1 to pass through the intersection IS at a lower speed while decelerating in the intersection IS and the settings of the deceleration start position DS and deceleration release position DE may be used in combination as appropriate.

In the offset intersection travel control process of the present embodiment, the processes other than those in the above-described steps S56 to S57 are the same as in the offset intersection travel control process of the third embodiment and therefore are borrowed herein, and the detailed description will be omitted.

As described above, according to the travel control method and travel control device 1 for a vehicle of the present embodiment, when the degree of overlap between the virtual subject vehicle lane VR1 and the virtual oncoming lane VR4 within the intersection IS increases from the intersection entrance IE toward the intersection exit IO, the subject vehicle is controlled to pass through the intersection IS at a lower speed while decelerating. This can eliminate or alleviate the uneasy feeling given to the occupants that the subject vehicle may interfere with the oncoming vehicle in the offset intersection.

Moreover, according to the travel control method and travel control device 1 for a vehicle of the present embodiment, in a case in which the degree of overlap between the virtual subject vehicle lane VR1 and the virtual oncoming lane VR4 within the intersection IS increases from the intersection entrance IE toward the intersection exit IO, the deceleration start position DS of the subject vehicle V1 at the intersection entrance IE is set on the nearer side with respect to the traveling direction of the subject vehicle V1 than in other cases, and the subject vehicle V1 can therefore enter the intersection IS with a slower deceleration. This can further alleviate the uneasy feeling given to the occupants that the subject vehicle may interfere with the oncoming vehicle in the offset intersection.

Furthermore, according to the travel control method and travel control device 1 for a vehicle of the present embodiment, in a case in which the degree of overlap between the virtual subject vehicle lane VR1 and the virtual oncoming lane VR4 within the intersection IS increases from the intersection entrance IE toward the intersection exit IO, the deceleration release position DE of the subject vehicle V1 at the intersection exit IO is set on the farther side with respect to the traveling direction of the subject vehicle V1 than in other cases, and the subject vehicle V1 can therefore pass through the intersection IS while maintaining a lower speed for a longer time. This can further alleviate the uneasy feeling given to the occupants that the subject vehicle may interfere with the oncoming vehicle in the offset intersection.

Moreover, according to the travel control method and travel control device 1 for a vehicle of the present embodiment, the deceleration release position DE at the intersection exit IO is set to the intersection point V1 between the first virtual line VL1 obtained by extending the side edge of the subject vehicle V1 on the oncoming lane R2 side straight from the intersection entrance IE and the second virtual line VL2 obtained by extending the side edge of the oncoming vehicle V2 on the subject vehicle lane R3 side straight from the intersection exit IO, and the subject vehicle V1 can therefore travel through the intersection IS while maintaining a lower speed for a longer time and release the deceleration after passing through the intersection point V1 at which the subject vehicle V1 and the oncoming vehicle V2 are closest to each other. This can further alleviate the uneasy feeling given to the occupants that the subject vehicle may interfere with the oncoming vehicle in the offset intersection.

DESCRIPTION OF REFERENCE NUMERALS

1 Travel control device
11 Sensors
12 Subject vehicle position detection device
13 Map database
14 Onboard equipment
15 Navigation device
16 Presentation device
17 Input device
18 Drive control device
19 Control device
V1 Subject vehicle
V2 Oncoming vehicle
R1, R3 Subject vehicle lane
R2, R4 Oncoming lane
VR1 Virtual subject vehicle lane
VR4 Virtual oncoming lane
IS Intersection
IE Intersection entrance
IO Intersection exit
SL1, SL2 Stop line
DS Deceleration start position
DE Deceleration release position

The invention claimed is:

1. A travel control method for a vehicle, in which a subject vehicle is controlled to autonomously travel on a road including intersections, the travel control method comprising:
   determining whether or not an intersection for the subject vehicle to seek to pass straight through is an offset intersection that is offset to right or left with respect to a direction straight ahead of the subject vehicle; and
   when the intersection is an offset intersection, controlling the subject vehicle to pass through the intersection at a lower speed than when the intersection is not an offset intersection.

2. The travel control method for the vehicle according to claim 1, comprising:
   calculating a degree of overlap between a virtual subject vehicle lane and an oncoming lane at an exit of the intersection, the virtual subject vehicle lane being obtained by extending a subject vehicle lane, in which the subject vehicle travels, straight from an entrance of the intersection, the oncoming lane at the exit of the intersection being opposed to the subject vehicle lane; and
   controlling the subject vehicle to pass through the intersection at the lower speed as the degree of overlap at the exit of the intersection increases.

3. The travel control method for the vehicle according to claim 1, comprising:
   calculating a degree of overlap between a virtual subject vehicle lane and a virtual oncoming lane within the intersection, the virtual subject vehicle lane being obtained by extending a subject vehicle lane, in which the subject vehicle travels, straight from an entrance of the intersection, the virtual oncoming lane being obtained by extending an oncoming lane of the subject vehicle lane straight from an exit of the intersection; and
   controlling the subject vehicle to pass through the intersection at the lower speed as the degree of overlap within the intersection increases.

4. The travel control method for the vehicle according to claim 1, wherein when the subject vehicle is controlled to pass through the intersection at the lower speed,
   deceleration of the subject vehicle is started at an entrance of the intersection; and
   the deceleration of the subject vehicle is released at an exit of the intersection.

5. The travel control method for the vehicle according to claim 3, wherein when the degree of overlap within the intersection increases from the entrance toward the exit of the intersection, the subject vehicle is controlled to pass through the intersection at lower speeds while decelerating.

6. The travel control method for the vehicle according to claim 3, wherein in a case in which the degree of overlap within the intersection increases from the entrance toward the exit of the intersection, a point for the subject vehicle to start deceleration at the entrance of the intersection is set on a nearer side with respect to a traveling direction of the subject vehicle than when the degree of overlap does not increase from the entrance to the exit of the intersection.

7. The travel control method for the vehicle according to claim 3, wherein in a case in which the degree of overlap within the intersection increases from the entrance toward the exit of the intersection, a point for the subject vehicle to release deceleration at the exit of the intersection is set on a farther side with respect to a traveling direction of the subject vehicle than when the degree of overlap does not increase from the entrance to the exit of the intersection.

8. The travel control method for the vehicle according to claim 7, wherein the point for the subject vehicle to release the deceleration at the exit of the intersection is set to an intersection point between a first virtual line obtained by extending a side edge of the subject vehicle on an oncoming lane side straight from the entrance of the intersection and a second virtual line obtained by extending a side edge of an oncoming vehicle on the subject vehicle lane side straight from the exit of the intersection.

9. The travel control method for the vehicle according to claim 1, wherein the subject vehicle is controlled to pass through the intersection at the lower speed as a width of a subject vehicle lane, in which the subject vehicle travels at an entrance of the intersection, becomes narrower.

10. A travel control device for a vehicle, comprising a processor for a subject vehicle to autonomously travel on a road including intersections, the processor being configured to:
   determine whether or not an intersection for the subject vehicle to seek to pass straight through is an offset intersection that is offset to right or left with respect to a direction straight ahead of the subject vehicle; and
   when the intersection is an offset intersection, control the subject vehicle to pass through the intersection at a lower speed than when the intersection is not an offset intersection.

* * * * *